May 31, 1949.    J. J. LUKACS ET AL    2,471,966
GROUND TRAINER FOR AIRCRAFT PERSONNEL
Filed March 1, 1945    8 Sheets-Sheet 1

FIG. I

INVENTORS  J.J. LUKACS
R.O. RIPPERE
BY  P.C. Smith
ATTORNEY

INVENTORS J. J. LUKACS
R. O. RIPPERE
BY P. C. Smith
ATTORNEY.

Patented May 31, 1949

2,471,966

UNITED STATES PATENT OFFICE 2,471,966

GROUND TRAINER FOR AIRCRAFT PERSONNEL

Joseph J. Lukacs, New Rochelle, and Robert O. Rippere, Massapequa, N. Y., assignors to Bell Telephone Laboratories, Incorporated, New York, N. Y., a corporation of New York Application March 1, 1945, Serial No. 580,324

14 Claims. (Cl. 35—12)

This invention relates to an aircraft trainer in which the operation of controls, similar to those of a standard aircraft, by the pilot, co-pilot, navigator or flight engineer, causes the operation of instruments on the pilots', navigator's and engineer's instrument panel and of instruments at the instructor's desk to simulate the instrument operations of an actual aircraft in flight whereby an aircraft crew may be given ground training to enable the crew members to coordinate their efforts to insure efficient aircraft operation under actual flying conditions in a regular aircraft.

In the training of aircraft personnel it has been the practice heretofore to give pilots basic training in aircraft of the trainer type and to give flight engineers and navigators ground training with the actual equipment of aircraft. Following such basic training it has been the practice to form crews from such basically trained personnel and to give such crews coordinated training in the flight of actual aircraft which they will later be assigned to fly in combat duty.

The larger aircraft, particularly multi-engined bomber airplanes are costly to build, to fly and to maintain and the use of such airplanes for extended training purposes with crews who may have had little actual experience in their operation, introduces a great hazard both to the equipment and to the operating personnel during the training period and obviously withdraws such airplanes from their more valuable use in actual combat services.

Since the members of the crew have all had basic training in flying and in the operation of equipment of airplanes, the actual flying hours in the type of airplane which they will ultimately be assigned to fly may be materially reduced through the use of a ground trainer designed to simulate all of the flight and operational functions of the type of airplane to which they will later be assigned. After coordinated training in such a ground trainer, the crew training may be completed within a comparatively few hours of flying in an actual airplane.

In the application of R. C. Davis, E. J. Fogarty and R. O. Rippere, Serial No. 542,986, filed June 30, 1944, a ground trainer has been disclosed in which an airplane crew may be trained to perform all of the flight and operational functions which would be required to actually fly and operate an airplane which the trainer is designed to simulate. In the application of J. J. Lukacs and W. B. Strickler, Serial No. 542,846, filed June 30, 1944, those portions of the same ground trainer have been disclosed which relate particularly to the training of the pilots and the flight engineer in the performance of all operational functions concerning the equipment of an airplane, as distinguished from flight control functions, which would be required to actually control the equipment of an airplane which the trainer is designed to simulate.

The present invention relates more particularly to an improvement in the circuits disclosed in the Lukacs and Strickler application above referred to, for simulating the engine and propeller operations of an aircraft, and has for its object the provision of means whereby the effects of the propeller efficiency upon the thrust horsepower output of the engine-driven propeller is more accurately determined and the provision of means whereby the simulation of the manual and automatic control of the propeller pitch is made more realistic and in a simpler manner.

These objects have been attained by the provision of a propeller slip ratio motor unit which replaces the former V/ND motor unit and the elimination of the former RPM memory motor unit with the resulting changes in the RPM, propeller pitch, manifold pressure, thrust horsepower and engine control circuits.

One feature of the invention is the provision of a manifold pressure circuit for each simulated engine which is responsive to the engine control circuit of the corresponding simulated engine, to the RPM circuit corresponding to the same simulated engine, to the altimeter circuit of the trainer, to supercharger blower speed controls at the flight engineer's station, to throttle controls accessible to the pilots and to the flight engineer and to a control at the instructor's desk. The manifold pressure circuit is instrumental in controlling and associated manifold pressure motor control circuit to control other control circuits of the trainer and to control the operation of the manifold pressure indicators on the pilots', flight engineer's and instructor's instrument panels.

A further feature of the invention is the provision of an RPM circuit for each simulated engine which is responsive to the control circuit of the corresponding simulated engine, to the manifold pressure circuit corresponding to the same simulated engine, to the true air speed circuit of the trainer, to the propeller pitch circuit corresponding to the same simulated engine and to the throttle controls accessible to the pilots and flight engineer. The RPM circuit is instrumental in controlling an associated RPM motor control circuit to control other control circuits of the trainer including a tachometer motor control circuit for operating tachometers on the pilots', flight engineer's and instructor's instrument panels, a sound effects circuit which simulates the explosion noises of the aircraft engine and a vibration simulating motor circuit.

A further feature of the invention is the provision of a propeller pitch circuit for each simulated engine which is responsive to the engine control circuit of the corresponding simulated engine, to the propeller governor and throttle controls accessible to the pilots and to the flight engineer, to the manifold pressure circuit corresponding to the same simulated engine and to the true air speed circuit of the trainer, which propeller pitch circuit is instrumental in controlling an associated propeller pitch motor control circuit to control the operation of other control circuits of the trainer.

A further feature of the invention is the provision of a thrust horse-power circuit common to both simulated engines which is responsive to the brake horse-power and propeller slip ratio circuits relating to both simulated engines and to the engine control circuits of both simulated engines, which thrust horse-power circuit is instrumental in controlling an associated thrust horse-power motor control circuit to control the operation of other control circuits of the trainer.

A further feature of the invention is the provision of a propeller slip ratio circuit for each simulated engine which is responsive to the true air speed circuit of the trainer and to the propeller pitch and RPM circuits corresponding to the same simulated engine, which propeller pitch circuit is instrumental in controlling an associated propeller slip ratio motor control circuit to control the operation of other control circuits of the trainer.

Other features of the invention will become apparent upon the consideration of the following detailed description of the invention when read in connection with the accompanying drawings in which:

Fig. 1 shows schematically in the upper right portion thereof the motor and control relays of the propeller slip ratio motor control circuit for the simulated right engine, in the upper left portion thereof the motor and control relays of the propeller slip ratio motor control circuit for the simulated left engine, in the lower right portion thereof the motor and control relays of the brake horse-power motor control circuit for the simulated right engine and in the lower left portion thereof the motor and control relays of the brake horse-power motor control circuit for the simulated left engine;

Figure 5:
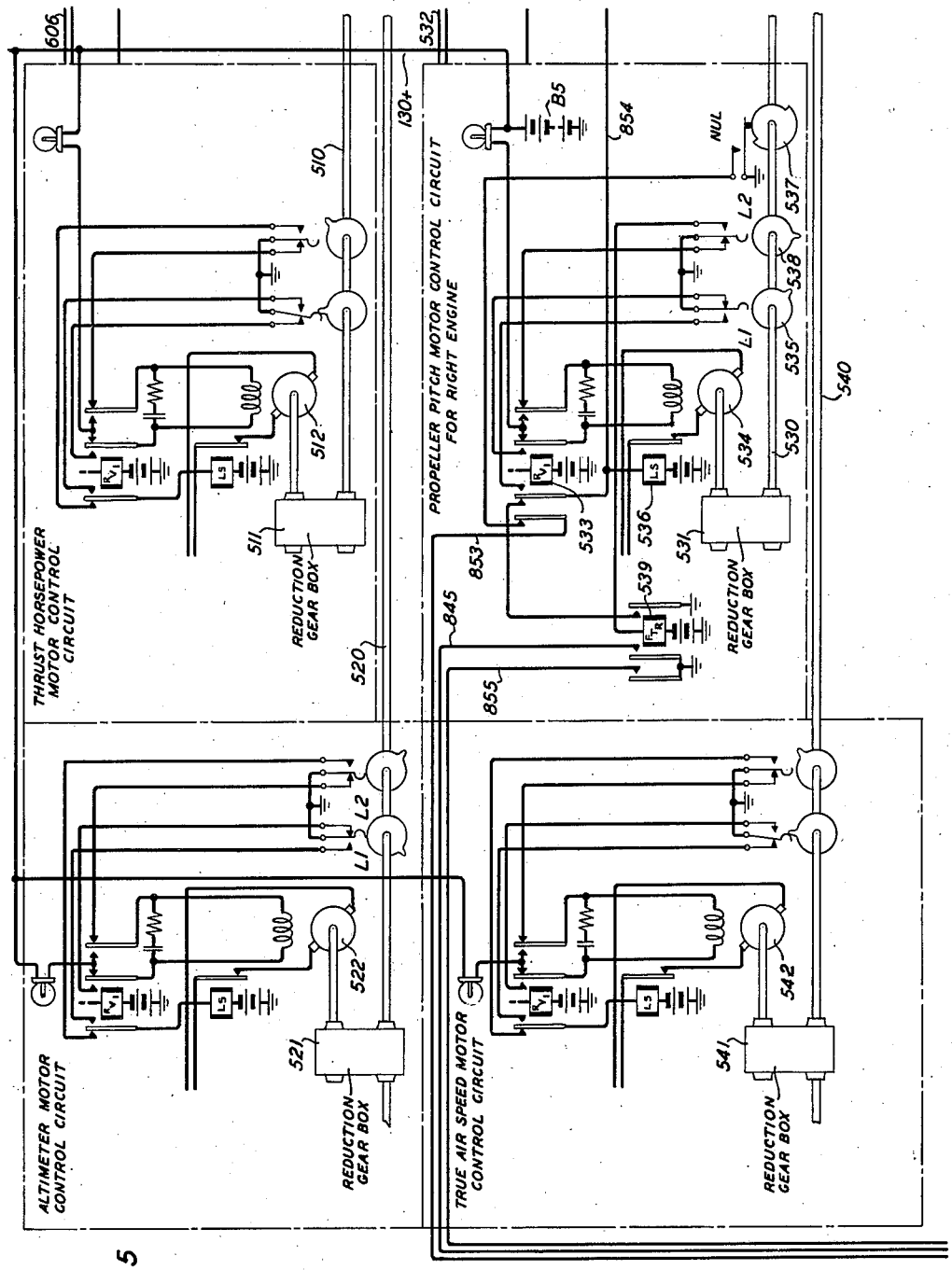
Figure 6:
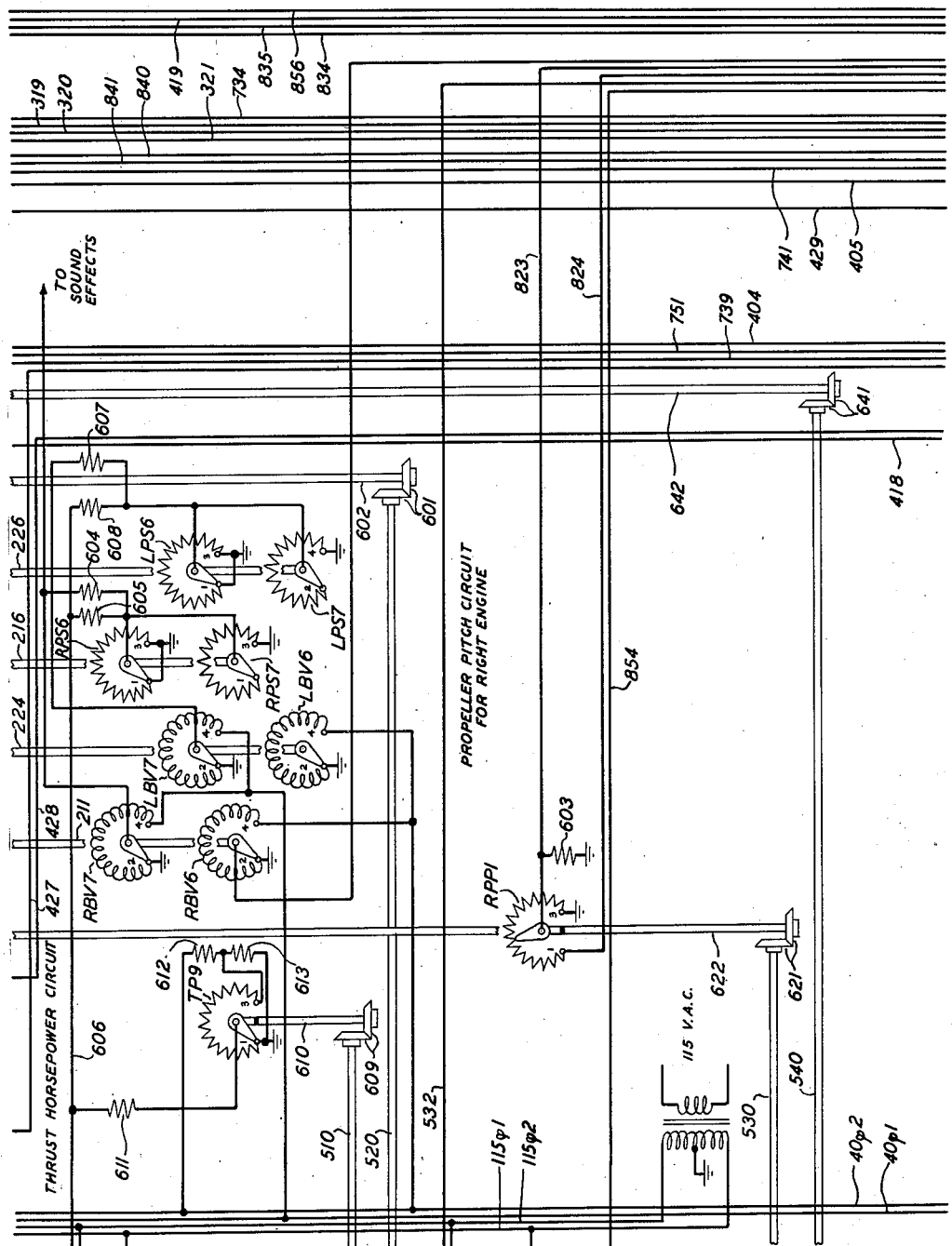
Figure 7:
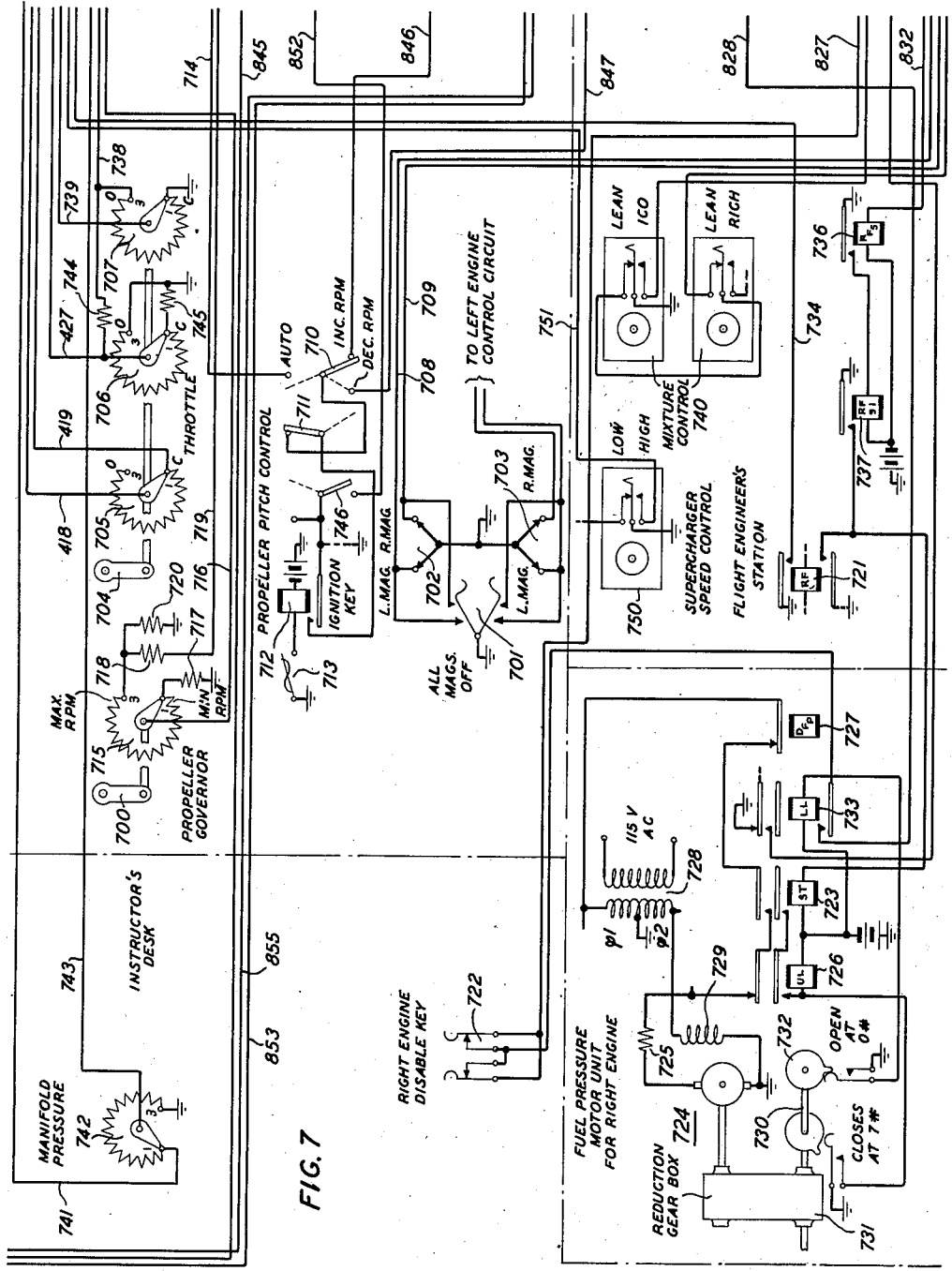
Figure 8:
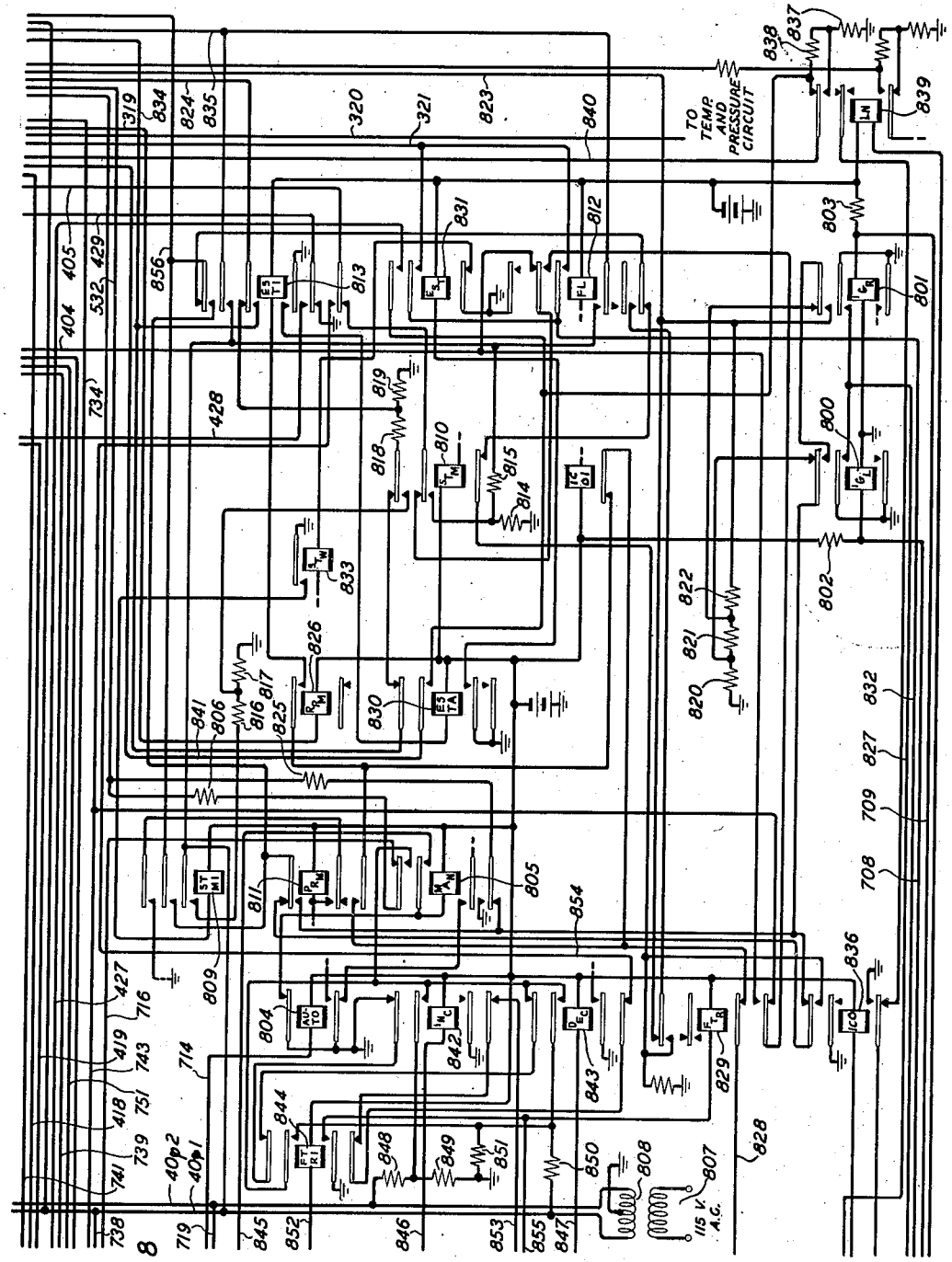

Fig. 5 shows in the upper right portion thereof the motor and control relays of the thrust horse-power motor control circuit, in the upper left portion thereof the motor and control relays of the altimeter motor control circuit of the trainer, in the lower right portion thereof the motor and control relays of the propeller pitch motor control circuit for the right engine and in the lower left portion thereof the motor and control relays of the true air speed motor control circuit of the trainer;

Fig. 6 shows in the upper portion thereof the thrust horse-power circuit and in the lower portion thereof the propeller pitch circuit for the right engine;

Fig. 7 shows in the upper right portion thereof the propeller governor, throttle and propeller pitch controls accessible to the pilots and to the flight engineer and the ignition key accessible to the pilots, in the upper left portion thereof a manifold pressure control and engine disabling key at the instructor's desk, in the lower right portion thereof supercharger blower speed and mixture controls and fuel supply control relays at the flight engineer's station, and in the lower left portion thereof the motor and control relays of the fuel pressure motor unit for the right engine;

Fig. 8 shows such portions of the control circuit for the right engine as are deemed necessary for an understanding of the invention; and Fig. 9 is a diagram illustrative of how the several figures of the drawing should be assembled to completely disclose the invention.

Figure 1:
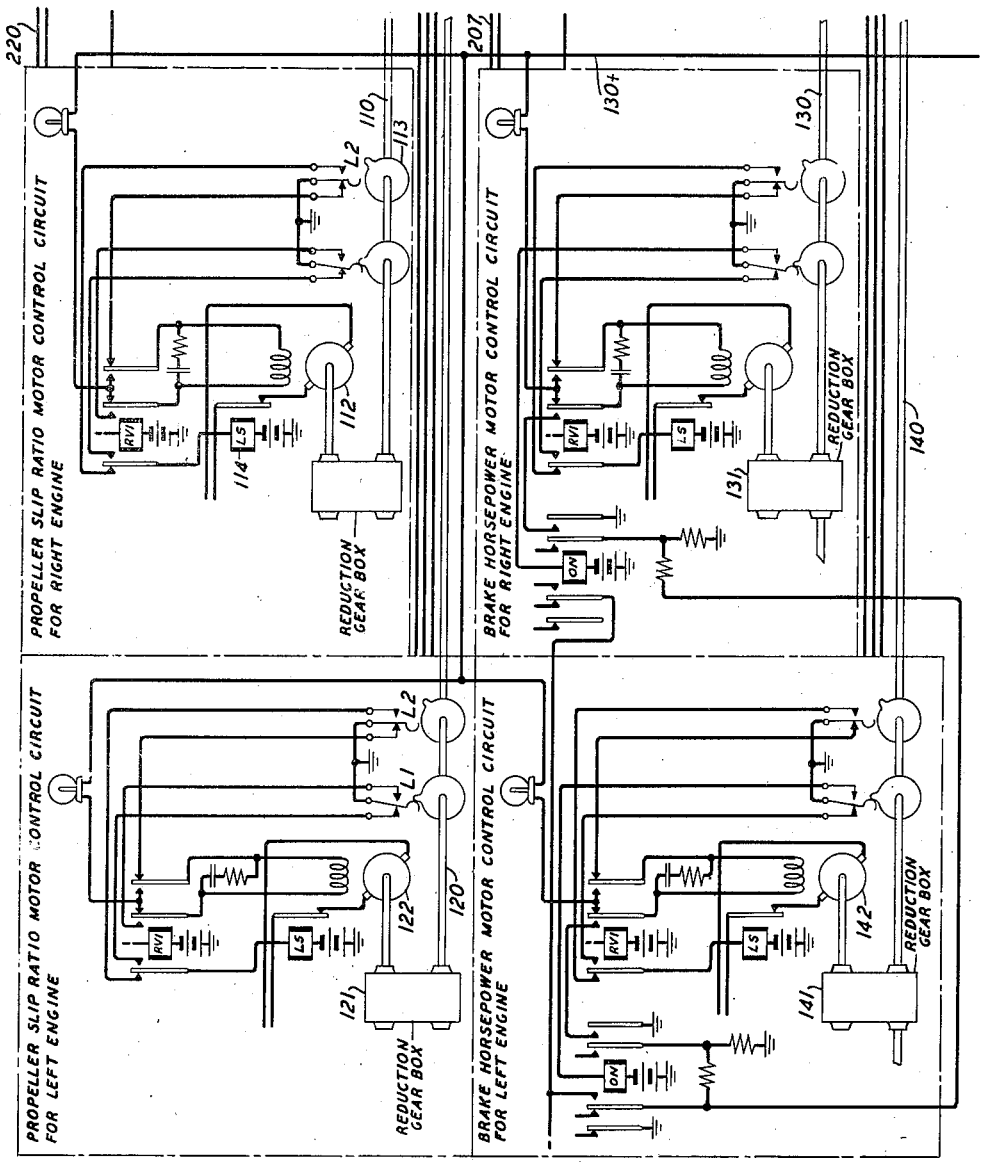

The motor control circuits are in general associated in pairs. For example, the two propeller slip ratio motor control circuits schematically illustrated in the upper portion of Fig. 1 and all of the potentiometers driven from their driving shafts constitute a single assembly. Each motor control circuit comprises a direct current reversible motor which, through a reduction gear box, drives a main driving shaft which, in turn, may drive one or more synchronous transmitters of the so-called "autosyn" type for controlling instruments remotely mounted on instrument panels of the trainer or on the instructor's desk, may drive potentiometers or variable auto-transformers of the so-called "variac" type for controlling other motor control circuits of the trainer and drives limit switches to insure that the driving motor will be arrested before the sliders of the potentiometers or variacs are driven beyond the ends of the windings with which they are associated. This equipment is mounted on a motor plate as schematically illustrated in the Patent No. 2,428,767, granted October 14, 1947, to W. P. Albert, R. C. Davis, R. H. Gumley, and W. H. T. Holdes. The relays, condensers, resistances, control rheostats, testing jacks and electronic devices associated with the equipment mounted on the motor plate are located on an apparatus rack positioned above and secured to the motor plate. Several of these motor plate and mounting rack assemblies are mounted one above the other in apparatus cabinets.

Figure 3:
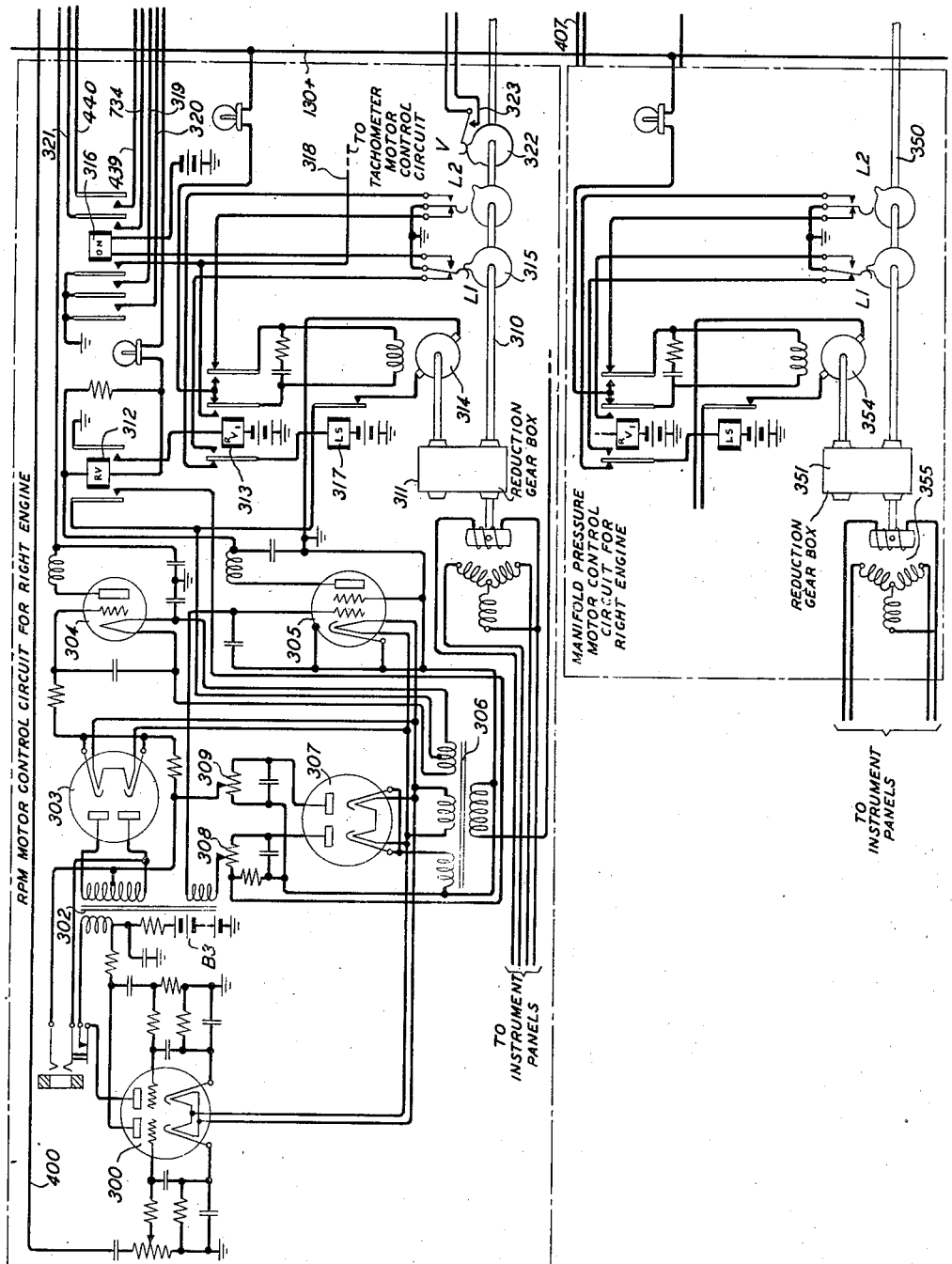
Fig. 3 shows in the upper portion thereof the RPM motor control circuit for the right engine and in the lower portion thereof the motor and control relays of the manifold pressure motor control circuit for the right engine.

Each of the motor control circuits, for example the circuit disclosed in full in the upper portion of Fig. 3, is disclosed and fully described in the Patent No. 2,428,767 above referred to. In general the circuit for controlling the motor 314 comprises a dual triode amplifier tube 300 which receives a signal incoming on conductor 400, amplifies it and applies it through the step-up transformer 302 to the anodes of the dual diode rectifier tube 303. The tube 303 serves as a full wave rectifier to rectify the output potential from tube 300 and to apply it as a positive potential to the grid of gas-filled tube 304. The output potential from tube 300 is also applied to the control grid of tube 305. Direct current for furnishing grid bias to the control grids of tubes 304 and 305 is supplied from the left secondary winding of power transformer 306 through the dual diode rectifier tube 307 under the control of the grid biasing control rheostats 308 and 309. Filament heating current for all of the tubes is supplied from the other secondary windings of the power transformer 306. Anode potential is supplied to the anodes of amplifier tube 300 from the anode battery B3 and 60-cycle anode potentials 180 degrees apart in phase are applied to the anodes of tubes 304 and 305. Potential of phase $\phi 1$ is applied from the phase $\phi 1$, 115-volt bus bar 115$\phi 1$ through the winding of anode relay 312, designated as RV to the anode of tube 305 and potential of phase $\phi 2$ is applied from the phase $\phi 2$, 115-volt bus bar 115$\phi 2$ to the anode of tube 304.

The motor 314 is of the direct current reversible type having its stator circuit energized by current from the direct current source B5 from the bus bar 130+ under the control of reversing relay 313, designated as RV1 which is in turn under the control of anode relay RV associated with the gas-filled tube 305, and whose rotor winding is energized by positive impulses of current transmitted therethrough by the firing of the gas-filled tube 304. When the input potential applied to conductor 400 is in phase with the potential of phase $\phi 1$ applied to the anode of tube 305 and out of phase with the potential of phase $\phi 2$ applied to the anode of tube 304, relays RV and RV1 will not operate and motor 314 will be operated in response to the incoming signal in one direction of rotation and when the input potential is out of phase with the potential of phase $\phi 1$ applied to the anode of tube 305 and in phase with the potential of phase $\phi 2$ applied to the anode of tube 304, relays RV and RV1 will operate and motor 314 will be operated in response to the incoming signal in the reverse direction. The motor terminals are so connected that with relay RV1 energized, the sliders of the potentiometers driven by the motor through the reduction gear box 311 and the shaft 319, are moved toward the No. 1 terminals of their windings and the motor is stopped by the operation of the cam-operated limit switch L1 when the sliders approach the No. 1 terminals, and with relay RV1 unenergized the sliders of the potentiometers are moved toward the No. 3 terminals of their windings and the motor is stopped by the operation of the cam-operated limit switch L2 when the sliders approach the No. 3 terminals of their associated windings.

Figure 2:
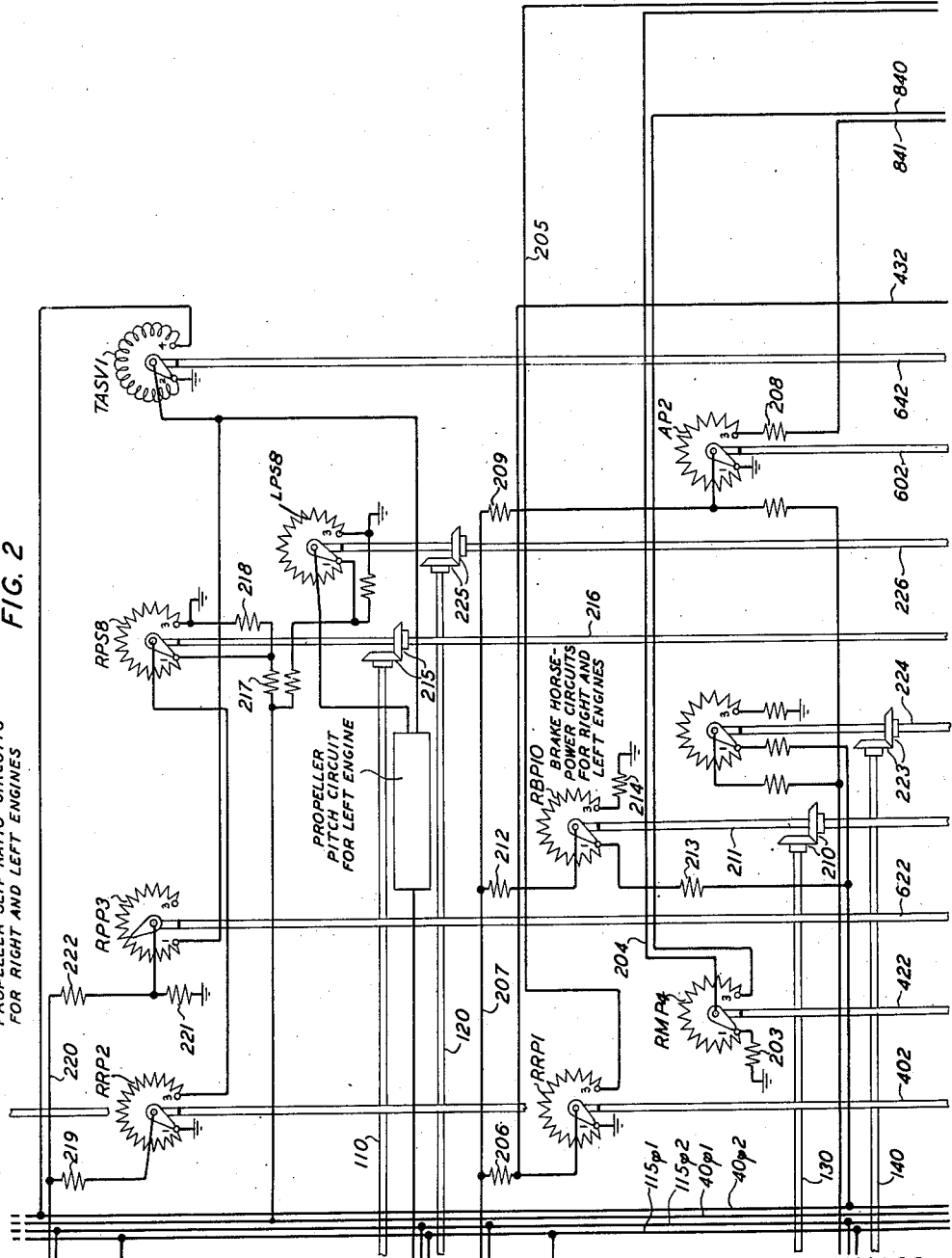
Fig. 2 shows in the upper portion thereof the propeller slip ratio circuits and in the lower portion thereof the brake horse-power circuits for both simulated engines.
Figure 4:
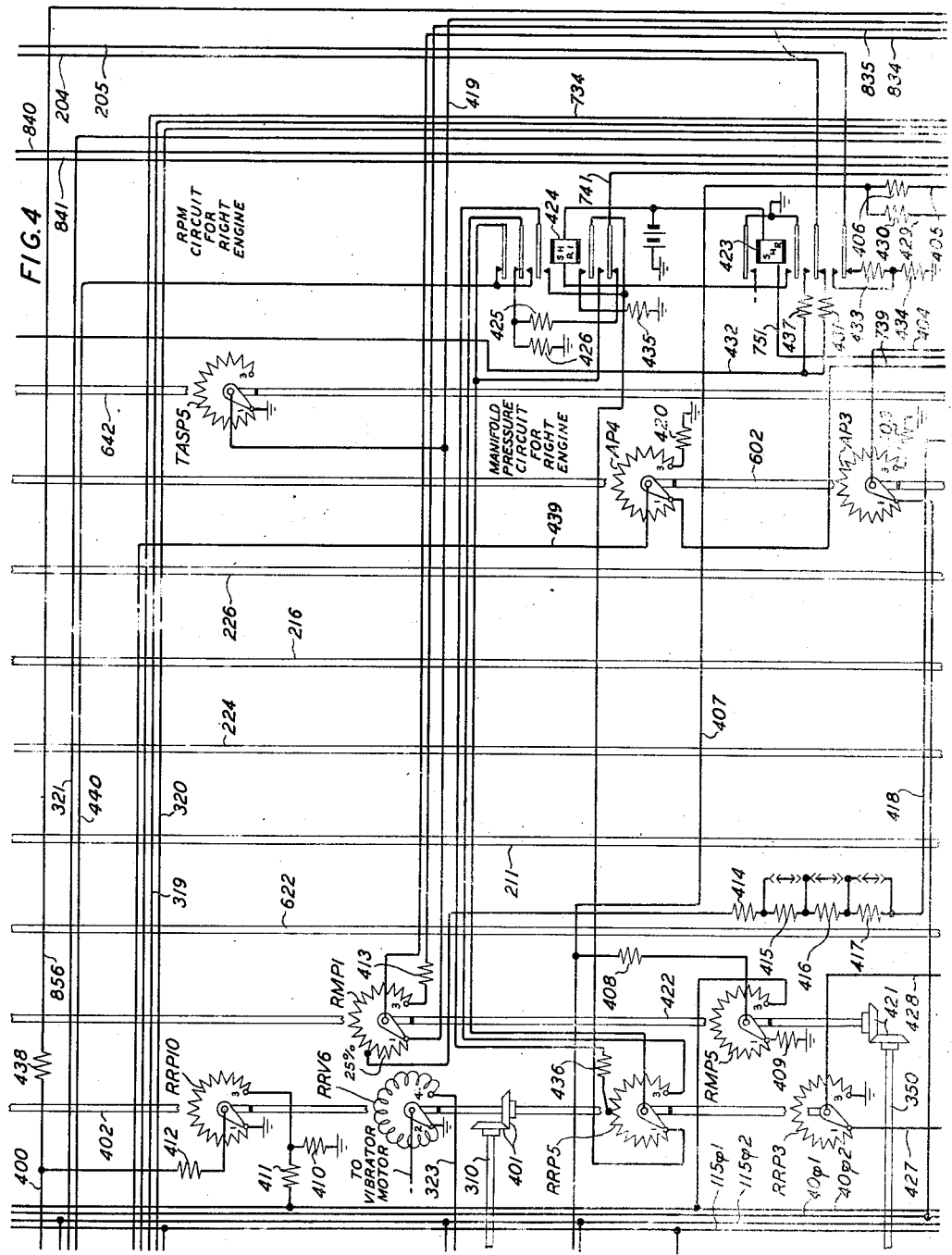
Fig. 4 shows in the upper portion thereof the RPM circuit and in the lower portion thereof the manifold pressure circuit for the right engine.

The potentiometers and variacs which are driven by a motor control circuit may enter into the control of several other motor control circuits of the trainer. For example, the RPM motor control circuit disclosed in Fig. 3 has a variac RRV6, in Fig. 4, in the circuit of a vibrator motor which simulates the vibrations set up by the operation of an engine, a potentiometer (not shown) associated with a tachometer motor control circuit, a potentiometer (not shown) associated with the fuel flow circuit, a potentiometer RRP1 associated with the brake horse-power circuit of Fig. 2, a potentiometer RRP2 associated with the propeller slip ratio circuit of Fig. 2, potentiometers RRP3 and RRP5 associated with the manifold pressure circuit of Fig. 4 and a balancing potentiometer RRP10 associated with its own control circuit of Fig. 4.

As previously stated, these variacs and potentiometers would all be mounted on the motor plate of the RPM motor unit and conductors would be extended therefrom to the various parts of the trainer where their controls are to be exercised. However, for the purpose of simplifying the disclosure so that all variacs and potentiometers which enter into the control of any one motor control circuit may be shown grouped together adjacent such motor control circuit, the driving shaft of each motor control circuit has been schematically illustrated as geared through unity ratio bevel gears, such as 401, to a shaft, such as 402, which extends across the several circuits over which the variacs and potentiometers which it drives exercise control.

Since the present invention is primarily concerned with those portions of the apparatus and circuits of the trainer which are applicable to the training of the flight engineer and pilots in the performance of their duties with respect to the operation and control of the main engines of the aircraft which the trainer simulates, the flight controls, flight instruments and the motor control circuits of the trainer which are responsive to the flight controls for simulating flight conditions and for simulating the operation of the flight instruments have not been disclosed herein. For a full disclosure of such apparatus and circuits, reference may be had to the application of R. C. Davis, E. J. Fogarty and R. O. Rippere hereinbefore referred to.

Furthermore, some of the circuits appertaining to the simulation of the operation of the main engines, such as the fuel flow, tachometer, cylinder and oil temperature and oil pressure circuits, and most of the apparatus at the flight engineer's station and at the instructor's desk have been omitted. This apparatus is fully disclosed in the application of Lukacs and Strickler hereinbefore referred to and on which this application is an improvement.

Since, however, the operation of the main engines of an aircraft is affected by the altitude at which a flight is being conducted and by the true air speed of the flight, the effect of altitude upon the circuits which simulate the operation of the engines is introduced by the potentiometers AP2, AP3 and AP4, the sliders of which are driven from shaft 602 which is in turn driven through the unity ratio bevel gears 601, shaft 520 and the reduction gear box 521 by the motor 522 of the altimeter motor control circuit disclosed schematically in Fig. 5. The effect of the true air speed is introduced by the variac TASV1 and potentiometer TASP5 driven by shaft 642, in turn driven through the unity ratio bevel gears 641, shaft 540 and the reduction gear box 541 by the motor 542 of the true air speed motor control circuit disclosed schematically in Fig. 5.

The apparatus employed in carrying out the invention having now been briefly described, the operation of the apparatus for crew training will now be described. Preparatory to simulating the starting of the right engine, the flight engineer operates the carburetor control switch therefor (not shown) to its direct air position, operates the mixture control switch 740 therefor to its rich mixture position and operates the supercharger blower speed control switch 750 therefor to its low speed position.

Before simulating the starting of the right main engine the pilot places the propeller governor 700 for the propeller driven by that engine in the maximum RPM increase position; pushes ignition switch 701 in; closes the right and left engine ignition keys 702 and 703 to the BOTH closed positions; and operates the throttle 704 to its extreme closed position in which the brushes of the rheostats 705, 706 and 707 operated thereby are moved to the lower C or closed terminals of their associated windings.

With the ignition key 702 operated to the BOTH position, indicating that both the right and left magnetos are to be used in starting the right engine, ground is removed from the left contact of such key opening the shunt established over conductor 708 around the winding of the IGL relay 800 and ground is removed from the right contact of such key, opening the shunt established over conductor 709 around the winding of the IGR relay 801. Relay 800 now operates in a circuit from battery through resistance 802 to ground through its winding and relay 801 operates in a circuit from battery through resistance 803 through its winding.

With the right propeller control switch 710 in its upper or automatic position, switch 711 in its upper or normal position and relay 712 operated by the previous operation of the right propeller governor circuit breaker 713, a circuit is established from ground over the contacts of relay 712, contacts of switches 711 and 710, over conductor 714 through the winding of relay 804 to battery. Relay 804 upon operating releases relay 805. With relay 805 released a circuit is established from the slider of potentiometer 715, positioned at the No. 3 terminal of its winding by the movement of the propeller governor control 700 to its MAX-RPM position, over conductor 716, over the upper back contact of relay 805, through resistance 806 to the signal input conductor 532 of the propeller pitch motor control circuit for the right engine disclosed schematically in Fig. 5. The winding of potentiometer 715 is energized over a circuit extending from ground, through resistance 717, through the potentiometer winding, through resistance 718 and over conductor 719 to the phase ϕ2 bus bar 40ϕ2. This bus bar is supplied with potential from the 115-volt alternating current source 807, through the transformer 808. The mid-point of the secondary winding of transformer 808 being grounded 40-volt potentials of phases ϕ1 and ϕ2 are simultaneously applied to the bus bars 40ϕ1 and 40ϕ2. To secure the desired operating potential across the winding of potentiometer 715, current flowing over conductor 719 is reduced by the series-connected resistance 718 and by the resistances 717 and 720 which together shunt the winding of the potentiometer.

With the maximum potential of phase ϕ2 derived from the propeller governor potentiometer 715 applied to the signal input conductor 532, this potential is amplified by an amplifier tube (not shown) but corresponding to tube 300, is rectified by the tube (not shown) but corresponding to tube 303 and is impressed upon the control grids of tubes (not shown) but corresponding to tubes 304 and 305. As a result, tubes corresponding to tubes 304 and 305 are both operated and the RV1 relay 533 becomes operated and the motor 534 is operated to cause the rotation of shaft 530 and through the unity ratio gears 621 to rotate the shaft 622 in such a direction as to move the sliders of the potentiometers RPP1 and RPP3 to their No. 1 terminals representative of a reduction in propeller pitch to reduce the drag on the engine when starting.

When the sliders of the potentiometers RPP1 and RPP3 approach the No. 1 terminals of their windings, the L1 limit switch is operated to its alternate position by cam 535 thereby establishing the circuit of the LS relay 536 which may be traced from ground over the alternate contacts of limit switch L1, over the left front contact of relay 533 to battery through the winding of relay 536. Relay 536 thereupon operates and opens the armature or rotor circuit of motor 534 to cause the motor to stop.

The flight engineer to simulate the starting of the right engine now operates the right engine start key (not shown), to the "on" position for approximately twelve seconds and then to the "mesh" position thereby causing the operation of relays including STW relay 833 and a timing tube ultimately resulting in the operation of the STM1 relay 809 which in turn causes the operation of the STM relay 810. It being assumed that the engine is cold, the flight engineer also operates the priming key (not shown) resulting in the operation of the PRM relay 811. The manner in which relays 809, 810 and 811 are operated is fully discussed in the application of Lukacs and Strickler hereinbefore referred to.

Prior to the operation of relay 810 a circuit is effective for starting the motor 354 of the manifold pressure circuit of Fig. 3 extending from ground through resistance 403, through potentiometer AP3 driven from the altimeter motor control circuit (the winding of which potentiometer is energized over a circuit from ground through resistance 403 from the 40ϕ1 bus bar), over conductor 404, over the upper back contact of the FL relay 812, over the inner upper back contact of the STM relay 810, over the lower back contact of the EST1 relay 813, conductor 405, and through resistance 406 to the signal input conductor 407 of the manifold pressure motor control circuit of Fig. 3. The potential applied to conductor 407 is amplified by an amplifier tube (not shown) but corresponding to tube 300 and is impressed upon the control grids of motor control tubes (not shown) but similar to tubes 304 and 305. As a result, the tube corresponding to tube 304 fires but the tube corresponding to tube 305 does not and the motor 354 is operated to rotate shaft 350 at a slow speed in one direction and through the unity ratio gears 421 to rotate shaft 422 in such a direction as to move the sliders of the potentiometers controlled thereby from the No. 1 terminals of their windings toward the No. 3 terminals of such windings. As soon as the slider of balancing potentiometer RMP5 has moved to a position such that the potential of phase ϕ2 applied through resistance 408 to conductor 407 from the slider of potentiometer RMP5 balances the signal potential of phase ϕ1 applied to conductor 407, the motor 354 of the manifold pressure motor control circuit will stop. Potential of phase ϕ2 is applied to the winding of potentiometer RMP5 over a circuit from the 40ϕ2 bus bar through the potentiometer winding and resistance 409 to ground. The potentiometers controlled by shaft 422 will now be adjusted to positions commensurate with the altitude as determined by the altimeter potentiometer AP3 or since the airplane has not taken off, the barometric pressure at sea level.

The manifold pressure indicators on the pilots', flight engineer's and instructor's instrument panels will be operated in the manner fully disclosed and described in the Lukacs and Strickler application hereinbefore referred to, through the operation of the autosyn transmitter 355, the rotor of which is driven from the shaft 350 of the manifold pressure motor unit.

As soon as the STM relay 810 operates, the circuit previously traced for applying potential of phase $\phi 1$ to the signal input conductor 407 of the manifold pressure motor control circuit is opened and a new circuit is established which extends from conductor 407, through resistance 406, over conductor 405, over the lower back contact of the EST1 relay 813 and over the inner upper front contact of the STM relay 810 to a point between resistances 814 and 815 of the potential divider comprising such resistances, which potential divider is supplied with potential from the $40\phi 1$ bus bar over a circuit extending from said bus bar through such resistances to ground. The potential now applied to conductor 407 is somewhat less than formerly applied due to the fact that the simulated engine is now assumed to be turning over under the control of the inertia starter and will therefore produce a suction in its manifold to reduce the manifold pressure slightly below the 30-inch barometric pressure.

With the potential of phase $\phi 1$ now applied to control conductor 407 less than the balancing potential of phase $\phi 2$ applied to conductor 407 by the balancing potentiometer RMP5, the overbalancing potential of phase $\phi 2$ is effective to control the motor 354 to drive the shafts 350 and 422 in such a direction as to move the sliders of the potentiometers driven by shaft 422 toward the No. 1 terminals of their windings indicative of a reduction in manifold pressure. The transmitting autosyn 355 driven by the shaft 350 also controls the operation of the manifold pressure indicators on the pilots', flight engineer's and instructor's instrument panels to show the reduced manifold pressure.

When the MAN relay 805 released, as previously described, in response to the setting of the propeller switch for automatic operation, circuits were established for applying potential of phase $\phi 1$ to the signal input conductors 400 and 532 of the RPM and propeller pitch motor control circuits from the $40\phi 1$ bus bar, over the inner upper front contact of the STM1 relay 809, through resistance 816 to the junction point between resistances 817 and 818 interconnected over the upper front contact of the STM relay 810, and thence over the resistance network of parallelly connected resistances comprising resistances 819 to 822, inclusive, resistance 603 of Fig. 6, and the winding of potentiometer RPP1. The resistance 819 forms one parallel branch of the network, resistances 820 to 822 connected in series form a second branch, resistance 603 forms a third branch and the winding of potentiometer RPP1 forms a fourth branch. Resistances 819, 820 and 603 and the winding of potentiometer RPP1 each have one terminal connected to ground and thus the ground terminals of the branches are interconnected, and the other terminals of the branches are interconnected over conductor 823 extending from the right terminal of resistance 822 to the ungrounded terminal of resistance 603 and the slider of potentiometer RPP1, thence over conductor 824 and the inner upper back contact of the EST1 relay 813 to the ungrounded terminal of resistance 819. The interconnected ungrounded terminals of the parallel branches of the resistance network are connected from conductor 823 over the upper front contacts of the IGR and IGL relays 801 and 800, assumed to have been operated, over the lower back contact of the MAN relay 805, through resistance 825 to the signal input conductor 532 of the propeller pitch motor control circuit of Fig. 5 and in parallel therewith over the upper front contact of the PRM relay 811 and the middle upper front contact of the STM1 relay 809, conductor 856, through resistance 438 and to the signal input conductor 400 of the RPM motor control circuit of Fig. 3.

The potential of phase $\phi 1$ applied over the resistance network to control conductor 532 of the propeller pitch motor control circuit is less than the potential of phase $\phi 2$ applied thereto as previously described and since the sliders of the potentiometers controlled by this motor control circuit have been moved to the No. 1 terminals of their windings and the potential of phase $\phi 2$ still predominates over the potential of phase $\phi 1$, the predominating potential of phase $\phi 2$ will hold the RV1 relay 533 operated and the LS relay 536 is thus maintained energized to prevent the motor 534 from moving the sliders of the potentiometers controlled thereby away from the No. 1 terminals of their windings.

The potential of phase $\phi 1$ applied over the resistance network to control conductor 400 is amplified by the tube 300 and is impressed upon the control grids of tubes 304 and 305 with the result that the tube 304 fires but tube 305 does not and consequently the RV and RV1 relays 312 and 313 are not operated and the motor 314 is operated in a direction to rotate the shaft 310 and through the unity ratio gears 401 to rotate shaft 402 and the sliders of the potentiometers controlled thereby away from the No. 1 terminals of their windings. The winding of balancing potentiometer RRP10 is connected in parallel with resistance 410 and is energized by potential of phase $\phi 2$ supplied from the $40\phi 2$ bus bar through resistance 411. The potential of phase $\phi 2$ derived from this potentiometer is applied from the slider thereof through resistance 412 to the signal input conductor 400 and when the slider of this potentiometer has been moved to a point such that the potential of phase $\phi 2$ is exactly equal and opposite to the potential of phase $\phi 1$ applied to conductor 400 as previously described, the amplifier tube 300 receives no signal potential and tube 304 no longer fires to cause the operation of the motor 314. The sliders of all of the potentiometers controlled by the RPM motor control circuit have now been set to positions representative of the speed at which the inertia starter is turning over the right engine.

As soon as shaft 310 leaves its normal position, cam 315 mounted thereon permits the operation of the limit switch L1 to its alternate position thereby establishing an obvious circuit for the "on" relay 316 which, upon operating prepares over its inner left contacts a reversing circuit through the stator circuit of the motor 314 and establishes a start circuit over conductor 318 for starting the tachometer motor control circuit (not shown). This latter control circuit functions in the manner fully disclosed in the application of Lukacs and Strickler hereinbefore referred to, to control the operation of the tachometers on the pilots', flight engineer's and instructor's instrument panels to indicate the speed at which the engine is being turned over by the inertia starter. Relay 316 also establishes a circuit from ground over its middle left contacts and over conductor 319 to battery through the winding of the RPM relay 826 of the engine control circuit of Fig. 8 and establishes a further circuit from ground over its outer left contacts and conductor 320 to the temperature and pressure circuit (not shown) appertaining to the simulated right engine, which then functions in the manner fully described in the application of Lukacs and Strickler hereinbefore referred to.

The STM1 relay 809 upon operating is also effective to establish a circuit for starting the sound effects circuit (not shown) to produce noises simulating the operation of the engine. The manner in which these sound effects are produced is fully disclosed in the Lukacs and Strickler application hereinbefore referred to.

It being assumed that the flight engineer has previously operated the fuel selector valve for supplying fuel from the right hull tank to the right engine and that the RF relay 721 of Fig. 7 has operated indicative of the fact that fuel is available for the right engine, then a circuit is established to start the electrically-driven fuel pressure pump to produce fuel pressure in the fuel line available for enabling the right engine to be primed and available to supply fuel to the right engine carburetor. The operation of the pressure pump is simulated by the fuel pressure motor unit disclosed schematically in the lower left portion of Fig. 7.

With relay 721 operated an obvious circuit is established for the start relay 723 of the fuel pressure motor unit which relay upon operating establishes a circuit through the rotor of the motor 724, through resistance 725, over the upper back contact of the UL relay 726, over the upper front contact of the ST relay 723 and over the back contact of the DFP relay 727 to the source of phase $\varphi$1 current supplied from the upper portion of the divided secondary winding of the power transformer 728. The stator winding 729 of the motor 724 is supplied with phase $\varphi$2 potential from the lower portion of the secondary winding of the power transformer 728 and the motor 724 consequently drives the shaft 730 through the reduction gear box 731 in such a direction as to cause the cam 732 carried by the shaft to rotate in a counter-clockwise direction and to thereby permit a closure of the contact springs associated with such cam and the consequent operation of the LL relay 733.

With relay 733 operated indicative of the fact that fuel pressure in the fuel line supplying the right engine has now been simulated, with ignition relays 800 and 801 operated indicative of the fact that the ignition key for the right engine has been operated, with the PRM relay 811 operated indicative of the fact that the engine priming switch has been operated and with the RPM relay 826 operated indicative of the fact that the engine is being turned over by the inertia starter, the right engine should start and begin to develop power. The EST1 relay 813 is operated if these starting conditions have been fulfilled over a circuit which may be traced from ground over the inner upper front contacts of relays 800 and 801, over conductor 827, over normally closed contacts of the right engine disable key 722 at the instructor's desk, over the lower contacts of the LL relay 733 of the fuel pressure motor unit, over conductor 828, over the inner lower back contact of the FTR relay 829, over the lower front contact of the PRM relay 811, over the front contact of the RPM relay 826 and to battery through the winding of the EST1 relay 813. Under the condition which would exist if the engine had been previously operating and priming would therefore be unnecessary and the PRM relay 811 would not therefore be operated, the circuit just traced would extend over the normal contacts of the ICO1 relay rather than over the lower contacts of relay 811.

Relay 813 upon operating establishes over its inner lower front contact an obvious circuit for the ESTA relay 830 which operates and in turn establishes over its inner lower front contact an obvious circuit for the EST relay 831. Relay 831 upon operating establishes a circuit for the RFS relay 736 at the flight engineer's station over a circuit which may be traced from ground, over the upper contacts of the RF relay 721, over conductor 734, over the inner right contacts of the ON relay 316 of the RPM motor control circuit, over conductor 321, over the inner upper contacts of the EST relay 831 and conductor 832 to battery through the winding of the RFS relay 736. Relay 736 thereupon operates in turn causing the operation of the RFS1 relay 737 which supplies an auxiliary operating circuit for the ST relay of the fuel pressure motor unit to insure that this motor unit will continue to simulate fuel pressure during intervals when the flight engineer is operating his fuel selector valve to switch the fuel feed line from one tank to another as fully described in the Lukacs and Strickler application hereinbefore referred to.

As soon as the EST relay 831 operates, it opens the circuit of the STW relay 833 which in turn releases the STM1 relay 809, followed by the STM relay 810 if the flight engineer has not in the meantime restored the engine start key to its normal position after observing from the tachometer and the increased engine noise that the engine is running under its own power. Relay 809 upon releasing also opens the locking circuit of the PRM relay 811 which now restores since it is assumed that the priming switch was only momentarily operated by the flight engineer to prime the engine and thus the initial operating circuit of relay 811 has been opened.

With the STM, STM1 and PRM relays 810, 809 and 811 released and the EST1 relay 813 operated, new circuits are established for applying signal potential of phase $\varphi$1 to the signal input conductor 532 of the propeller pitch motor control circuit, to the signal input conductor 400 of the RPM motor control circuit and to the signal input conductor 407 of the manifold pressure motor control circuit.

Potential of phase $\varphi$1 is applied to the signal input conductors 400 and 532 of the RPM and propeller pitch motor control circuits from the $\varphi$1 bus bar, over the middle upper front contact of the EST1 relay 813, over conductor 835, through resistance 413 to the resistance network of parallelly connected resistances comprising resistances 820 to 822, inclusive, resistance 603 of Fig. 6, potentiometers RPP1, RMP1 and TASP5, rheostat 705 and the adjustable resistance comprising the series connectable resistances 414 to 417, inclusive. Resistances 820 to 822, inclusive, connected in series form one parallel branch of the network, resistance 603 forms a second branch, the winding of potentiometer RPP1 forms a third branch and the fourth branch comprises such a portion of the winding of potentiometer TASP5 as is determined by the positioning of its slider in accordance with the true air speed of the flight, connected in series with such a portion of the winding of potentiometer RMP1 as is determined by the positioning of its slider in accordance with the manifold pressure. The lower 25 per cent of the winding of potentiometer RMP1 is wound with higher resistance wire than the remaining 75 per cent and is shunted by the variable shunt including the throttle controlled rheostat 705 and the adjustable resistance comprising the series-connected resistances 414 to 417, inclusive. Resistances 820 and 603 and the windings of potentiometers RPP1 and TASP5 each have one terminal connected to ground and thus the grounded terminals of the branches are interconnected and the other terminals of the branches are interconnected over conductor 823 extending from the right terminal of resistance 822 to the ungrounded terminal of resistance 603 and the slider of potentiometer RPP1, thence over conductor 824 and the inner upper front contact of the EST1 relay 813, over conductor 834 to the slider of potentiometer RMP1, through the left portion of the winding of such potentiometer to the slider of potentiometer TASP5 and through the left portion of the winding thereof to its grounded terminal. The interconnected ungrounded terminals of the parallel branches of the resistance network are connected from conductor 823, over the upper front contact of the IGR and IGL relays 801 and 809, assumed to have been operated, over the lower back contact of the MAN relay 805, through resistance 825 to the signal input conductor 532 of the propeller pitch motor control circuit of Fig. 5, and in parallel therewith over the upper back contact of the ICO relay 836, over the upper back contact of the PRM relay 811 and over the upper front contact of the EST1 relay 813, conductor 856, through resistance 438 to the signal input conductor 400 of the RPM motor control circuit of Fig. 3.

At this time the slider of the propeller pitch potentiometer RPP1 is at the No. 1 terminal of its winding since, as previously described, the propeller pitch has been assumed to have been set for maximum RPM whereby its maximum resistance of 10,000 ohms is included in its branch of the network, the slider of the true air speed potentiometer TASP5 is at the No. 1 terminal of its winding since at this time the air speed is zero, the slider of the throttle rheostat 705 is at the No. 1 terminal of its winding since the throttle is at this time closed and the slider of the manifold pressure potentiometer RMP1 is at a position on its winding corresponding to the manifold pressure produced by the suction on the manifold at the time the engine starts. Such ones of the resistances 415, 416 and 417 are included in the shunt of the left 25 per cent of the winding of manifold pressure potentiometer RMP1 as is necessary to make the resistance of the branch of the network including the winding of potentiometer RMP1 such that with the air speed zero, with the propeller pitch set for the maximum RPM and the throttle closed, the potential of phase $\phi_1$ applied to the signal input conductor 400 will be such as to cause the RPM motor control circuit to adjust the potentiometers controlled thereby until the tachometers on the pilots', flight engineer's and instructor's instrument panels show an idling speed of 450 revolutions per minute. As the engine speed increases, the manifold pressure will also change and this change is introduced by the adjustment of the manifold pressure potentiometer RMP1 included in the control of the RPM motor control circuit as will be presently described.

The potential of phase $\phi_1$ applied over the resistance network to the control conductor 532 of the propeller pitch motor control circuit is still less than the potential of phase $\phi_2$ applied thereto under the control of the propeller governor rheostat 715 as previously described and, since the sliders of the potentiometers controlled by this motor control circuit have been moved to the No. 1 terminals of their windings and the potential of phase $\phi_2$ still predominates over the potential of phase $\phi_1$, the predominating potential of phase $\phi_2$ will hold the RV1 relay 533 operated. The LS relay 536 is thus maintained energized to prevent the motor 534 from moving the sliders of the potentiometers controlled thereby away from the No. 1 terminals of their windings.

Following the operation of the EST1 relay 813, the circuit over which potential of phase $\phi_1$ was applied to the signal input conductor 407 of the manifold pressure motor control circuit is changed so that this circuit is controlled to show changes in the manifold pressure in response to throttle opening, to RPM, to the altitude at which the flight is conducted and to the speed at which the supercharger blower is assumed to be operated. The major control of the manifold pressure motor control circuit is now exercised by the application of potential of phase $\phi_1$ derived from the throttle-controlled rheostat 707, the winding of which is energized from the 40$\phi_1$ bus bar over conductor 738, which potential is applied from the slider of such rheostat over conductor 739, through the winding of the altitude potentiometer AP4 and resistance 420 to ground. Potential derived from the slider of potentiometer AP4 is then applied over conductor 439, over the outer right contacts of the ON relay 316 of the RPM motor control circuit of Fig. 3, over conductor 440 over the upper back contact of the SHR1 relay 424 (which is at the time deenergized since the flight engineer has, as previously described, operated the supercharger blower speed control 750 into its low speed position), through the RPM potentiometer RRP5, over the middle upper back contact of relay 424 to the junction point between resistances 425 and 426. The resistance 425 is connected over the lower back contact of relay 424 and conductor 741 with the No. 1 terminal of the manifold pressure rheostat 742 at the instructor's desk, Fig. 7, the No. 3 terminal of which rheostat is connected to ground. One terminal of resistance 426 is also connected to ground. The potential of phase $\phi_1$ applied to the junction point between resistances 425 and 426 is thus attenuated over the path through resistance 426 to ground and also over the path through resistance 425 and the winding of rheostat 742 to ground and the potential derived from the slider of rheostat 742 now becomes applied over conductor 743 and the lower front contact of the EST1 relay 813, over conductor 405 and through resistance 406 to the signal input conductor 407. It is to be noted, however, that with the throttle in its closed position the slider of the throttle-controlled rheostat 707 is at the No. 1 or grounded terminal of its winding and consequently no signal potential is applied over the circuit just traced to the signal input conductor 407.

At the same time potential of phase $\phi_1$ which is applied from the 40$\phi_1$ bus bar over conductor 738 through resistance 744 to the slider of the throttle controlled rheostat 706 (the winding of which is shunted by the resistance 745 and the No. 1 terminal of which winding is connected to ground) is applied over conductor 427 and through the winding of the RPM potentiometer RRP3 to ground. The potential derived at the slider of the RPM potentiometer RRP3 is applied over conductor 428, over the middle lower front contact of the EST1 relay 813, over conductor 429 and through resistance 430 to the signal input conductor 407 of the manifold pressure motor control circuit. With the throttle in its closed position and consequently with the slider of the throttle-controlled rheostat 707 at the No. 1 terminal of its winding, potential of phase φ1 is applied over the circuit just traced to control conductor 407 which potential decreases as the RPM increases from the speed at which the engine was turned over by the inertia starter to the idling speed of 450 revolutions per minute and the slider of the RPM potentiometer RRP3 moves toward the No. 3 terminal of its winding.

As the potential of phase φ1 thus applied to the control conductor 407 decreases, the potential of phase φ2 applied as previously described to conductor 407 from the balancing potentiometer RMP5 overbalances the signal potential of phase φ1 and as a consequence the motor 354 is controlled by the manifold pressure motor control circuit to rotate the shaft 422 in such a direction as to move the sliders of the potentiometers controlled thereby toward the No. 1 terminals of their windings. This movement of the slider of potentiometer RMP5 results in a decrease of the potential of phase φ2 applied to conductor 407 until it again balances the signal potential of phase φ1 applied through the RPM potentiometer RRP3 as previously described, when the slider of potentiometer RRP3 comes to rest indicative of an engine idling speed of 450 revolutions per minute. The sliders of the manifold pressure potentiometers will now have been adjusted to positions indicative of an idling manifold pressure of approximately 10 inches of mercury and this pressure will be indicated on the manifold pressure indicators on the pilots', flight engineer's and instructor's instrument panels.

The effect of change in manifold pressure is a factor in determining the RPM of the engine. This effect is introduced as previously stated upon the signal input conductor 408 of the RPM motor control circuit by the positioning of the slider of the RMP1 potentiometer. The movements of the shafts 402 and 422 of the RPM and manifold pressure motor units commensurate with the idling speed of the engine and the consequent change in the manifold pressure, also affect the fuel flow circuit (not shown) in the manner fully set forth in the application of Lukacs and Strickler hereinbefore referred to. As the shaft 432 is rotated to show an increased simulated engine speed, the sound effects circuit is controlled to produce sounds indicative of the increased speed.

When the shaft 310 of the RPM motor unit has been rotated to a position corresponding to a speed of approximately 400 revolutions per minute, the contacts of the switch V are closed by the cam 322 mounted on the shaft 310 to establish a circuit from the 115-volt bus bar 115φ2 over contacts of the switch V and conductor 323 to ground through the winding of the variac RRV6 from which power is derived for driving the vibrator motor (not shown) connected to the right side of the trainer mock-up. The shaft of this motor carries an eccentrically mounted weight whereby the vibration set up in the right portion of the mock-up simulates the vibration due to the propeller driven by the right engine. This vibration increases as the right engine speed increases.

The EST relay 831 upon operating establishes a circuit from the 40φ1 bus bar over its upper contacts to a point in the potential divider extending from ground through resistances 837 and 838, over the upper back contact of the LN relay 839, over conductor 840, through the winding of the manifold pressure potentiometer RMP4 and resistance 203 to ground. A potential determined by the position assumed by the slider of potentiometer RMP4 is applied over conductor 204, over the middle lower back contact of the SHR relay 423, through resistance 431, over conductor 432 to the slider of the RPM potentiometer RRP1 and over the potential divider extending from ground through the potentiometer winding, over conductor 205, over the lower back contact of the SHR relay 423, through resistances 433 and 434 to ground, and in parallel with the latter circuit divider through resistance 206 to the signal input conductor 207 of the brake horse-power motor control circuit of Fig. 1 appertaining to the right engine. Potential is also applied from the junction point between the back contact of the LN relay 839 and resistance 838, over the inner upper front contact of the ESTA relay 830, over conductor 841, through resistance 208 and the winding of the altimeter potentiometer AP2 to ground and the potential derived at the slider of this potentiometer is applied through resistance 209 to the signal input conductor 207.

The brake horse-power motor control circuit is thereby controlled to rotate the shaft 130 and through the unity ratio bevel gears 210 to rotate the shaft 211 until the slider of the balancing potentiometer RBP10 reaches a position in which the potential of phase φ2 applied thereover and through resistance 212 to control conductor 207 equals the potential of phase φ1 applied to conductor 207. When this state of balance is reached, the rotation of shaft 211 ceases. The potential of phase φ2 over the slider of potentiometer RBP10 is derived from the winding of the potentiometer which is energized in a circuit from the bus bar 40φ2, through resistance 213 and through the winding of such potentiometer and resistance 214 to ground. The brake horse-power therefore varies in accordance with the equation $$BHP = [f(MP) \times f(RPM) \times (MIXTURE)] + f(ALT) - F(ENGINE)$$

where the function $f(MP)$ of manifold pressure is determined by the potentiometer RMP4, the function $f(RPM)$ of engine RPM is determined by the potentiometer RRP1, the mixture function by the condition of the LN relay 839, the function $f(ALT)$ of altitude by the potentiometer AP2 and the function $F(ENGINE)$ with respect to supercharging by the condition of the supercharger relay 423. When the RPM passes a certain value, the resistance network is so designed that a further increase in RPM, as indicated by the movement of the slider of potentiometer RRP1, then causes a decrease in brake horse-power as would be the case in an aircraft.

The operation of the propeller pitch motor control circuit as previously described has resulted in the movement of the slider of the RPP3 potentiometer to the No. 1 terminal of its winding. The true air speed variac TASV1 is so arranged that with the air speed indicators of the trainer showing zero air speed, the slider of this variac will normally stand in a position with respect to its winding corresponding to an air speed of approximately 48 knots. Consequently with the winding of the variac energized by potential of phase $\phi2$ from the $40\phi2$ bus bar, potential of phase $\phi2$ is derived at the slider of the variac and applied through the propeller pitch potentiometer RPP3, through resistance 221 to ground and through resistance 222 to the signal input conductor 220 of the propeller slip ratio motor control circuit of Fig. 1. This potential will be instrumental in operating the motor 112 of this motor control circuit in such a direction as to hold the sliders of the potentiometers controlled thereby at the No. 1 terminals of their windings.

As soon, however, as the RPM motor control circuit of Fig. 3 is operated in simulation of the starting of the right engine, and the slider of the potentiometer RRP2 operated thereby moves away from its No. 1 or grounded terminal, potential of phase $\phi1$ will be applied to the signal input conductor 220. To accomplish this, potential of phase $\phi1$ is applied from bus bar $40\phi1$ through resistance 217 and through resistance 218 and the winding of the propeller slip ratio potentiometer RPS8 connected in parallel to ground, the potential derived at the slider of this potentiometer being applied through the winding of the RPM potentiometer RRP2 to ground and the potential of phase $\phi1$ derived at the slider of the latter potentiometer being applied through resistance 219 to conductor 220. However, until the RPM potentiometer RRP2 is adjusted to a position indicative of an engine speed above the idling speed of 450 revolutions per minute, the potential of phase $\phi1$ applied thereover will not overcome the potential of phase $\phi2$ applied under the control of the true air speed variac TASV1 and the sliders of the propeller slip ratio potentiometers will not therefore move away from the No. 1 terminals of their windings.

Equipment (not shown) for simulating the left engine is identical with that disclosed for simulating the right engine and is operated to simulate the starting of the left engine in the manner just described resulting in the control of the manifold pressure, RPM, tachometer, propeller pitch, brake horse-power, propeller slip ratio, fuel flow and fuel pressure motor units appertaining to the left engine; in the operation of the instruments on the instrument panels to indicate the engine speed and manifold pressure and in the control of the sound effects and vibrator circuits to simulate the engine noise and propeller vibration.

As a result of the operation of the brake horse-power motor control circuit for the left engine, the motor 142 thereof rotates the shaft 140 and through the unity ratio bevel gears 223 rotates the shaft 224 to position the sliders of the potentiometers driven thereby in positions commensurate with the brake horse-power output of the left engine at the assumed idling speed of 450 revolutions per minute. As a result of the operation of the propeller slip ratio motor control circuit for the left engine, the motor 122 thereof rotates the shaft 120 and through the unity ratio bevel gears 225 rotates the shaft 226 to hold the sliders of the potentiometers driven thereby on the No. 1 terminal ends of their windings.

With both engines running, circuits are established for controlling the thrust horse-power motor control circuit of Fig. 5. One of these control circuits extends from the slider of brake horse-power variac RBV7 for the right engine (the winding of which is energized by current from the $40\phi1$ bus bar), through resistance 604 to the sliders of the propeller slip ratio potentiometers RPS6 and RPS7 and through resistance 605 to the signal input conductor 606 of the thrust horse-power motor control circuit. A second control circuit extends from the slider of brake horse-power variac LBV7 for the left engine (the winding of which is energized by current from the $40\phi1$ bus bar), through resistance 607 to the sliders of the propeller slip ratio potentiometers LPS6 and LPS7 and through resistance 608 to the signal input conductor 606. However, with the engines idling and the sliders of the propeller slip ratio potentiometers RPS6, RPS7, LPS6 and LPS7 at the No. 1 terminals of their windings indicative of a zero slip ratio, no potential will be applied over the circuits just traced to conductor 607 and the thrust horse-power control circuit is not operated, thereby representing the development of no thrust horse-power by the propellers.

To prepare for a simulated take-off, with the propeller governor controls for the engines set into their MAX-RPM positions in which the sliders of the rheostats controlled thereby are moved to the No. 3 terminals of their windings, the pilot moves the two engine throttles together to move the sliders of the rheostats controlled thereby toward their upper or open throttle positions. In response to the movement of the slider of the throttle-controlled rheostat 705 for the right engine, the resistance of the shunt through the winding of rheostat 705 over conductors 418 and 419 and through resistance 414 and the selected portion of the group of resistances 415 to 417, inclusive, will be increased and more of the potential of phase $\phi1$ applied over conductor 835, through resistance 413, through the winding of potentiometer RMP1 to ground will be available at the slider of potentiometer RMP1, and the potential applied to the signal input conductors 400 and 532 of the RPM and the propeller pitch motor control circuits for the right engine will be increased. As a consequence the RPM motor control circuit will rotate the shaft 402 and thereby the sliders of the potentiometers and variacs controlled thereby to an amount representative of an increase of the RPM of the right engine. Responsive to this operation, a potentiometer (not shown) driven by the shaft 402 controls the tachometer motor control circuit to cause the tachometers on the pilots', flight engineer's and instructor's instrument panels to indicate an increase of engine speed.

As the right engine throttle is opened, the potential of phase $\phi1$ applied over the resistance network to control conductor 532 of the propeller pitch motor control circuit for the right engine is increased but is still less than the potential of phase $\phi2$ applied to control conductor 532 as previously described, and consequently the motor 534 is not operated to drive the sliders of the potentiometers controlled thereby away from the No. 1 terminals of their windings.

In a similar manner, the RPM motor control circuit for the left engine responds to the opening of the left engine throttle. As just described, the sliders of the potentiometers driven by the motor of the propeller pitch motor control circuit for the left engine remain positioned at the No. 1 terminals of their windings. The engine throttles are thus operated until the tachometers for the two engines indicate engine speeds of 1900 revolutions per minute. As the engine speeds increase, the manifold pressures of the engines will increase until the manifold pressure indicators show readings of 27 inches of mercury.

With the engines both running at the indicated speed of 1900 revolutions per minute, the pilot checks to determine if both of the magnetos associated with each engine are functioning properly. Considering the engine control circuit relating to the right engine, the pilot first turns the right engine ignition key 702 (Fig. 7) to the position in which ground is removed from its right magneto terminal but remains connected to the left magneto terminal. This causes the shunting down of the IGL relay 800 of Fig. 8 resulting in the removal of resistances 821 and 822 from the branch of the resistance network over which potential of phase $\phi 1$ was applied to the signal input conductors 400 and 532 of the RPM and propeller pitch motor control circuits and the rotation of shaft 402 driven by the motor 314 of the RPM motor control circuit in a direction in which the tachometers on the pilots', flight engineer's and instructor's instrument panels show a decrease of indicated RPM to 1800 or 1850 revolutions per minute. The ignition key 702 is now turned to the position in which ground is removed from the left magneto terminal but is connected to the right magneto terminal. This causes the reenergization of the IGL relay 800 and the shunting down of the IGR relay 801 resulting in the removal of resistance 822 from the branch of the resistance network over which potential of phase $\phi 1$ was applied to the signal input conductors 400 and 532. No change in the indicated RPM will now be noted if both magnetos are functioning. The ignition key is then moved to the position in which the IGL and IGR relays 800 and 801 are both operated resulting in the operation of the tachometers to read 1900 revolutions per minute. These operations are then repeated for the left engine.

The pilot now gradually moves both throttle controls forward whereby the sliders of the rheostats controlled thereby are moved further toward their upper or open throttle positions. As a result the RPM motor control circuits for the two engines are controlled to move the shafts, such as 402, to new positions whereby the tachometers on the instrument panels show a further increase in the engine speeds.

In response to the movement of the sliders of the throttle controlled rheostats 706 and 707 for the right engine toward the upper terminals of their windings, the potential of phase $\phi 1$ applied from the slider of rheostat 76 over the circuit previously traced to the signal input conductor 407 of the manifold pressure motor control circuit for the right engine, is increased. This potential not only increases with the throttle opening but also increases with the increase of RPM also resulting from the throttle opening as previously described. At the same time the potential of phase $\phi 1$ applied from the slider of the throttle controlled rheostat 707 over the circuit previously traced to the signal input conductor 407 of the manifold pressure motor control circuit for the right engine will increase. As a result, the manifold pressure motor control circuit will function to control the movements of the shafts 350 and 422 into new positions resulting in the setting of the transmitting autosyn 355 to control the operation of the manifold pressure indicators on the instrument panels to indicate an increase of manifold pressure for the right engine to about 44 inches of mercury. The manifold pressure motor control circuit for the left engine (not shown) is similarly controlled in response to the operation of the left engine throttle whereby the left engine manifold pressure indicators on the instrument panels also show an increase in manifold pressure to 44 inches of mercury.

With the increase in manifold pressure the engines will develop enough power to cause the airplane to move through the water and to pick up air speed. In the trainer as the sliders of the throttle controlled rheostats approach their upper or open throttle positions, the potentials of phase $\phi 1$ applied to the signal input conductors of the propeller pitch motor control circuits increase until such potentials become slightly greater than the potentials of phase $\phi 2$ applied to such conductors under the control of the propeller governor rheostats and such motor control circuits will operate to adjust the potentiometers controlled thereby into positions indicative of a change of propeller pitch. For example, when the potential of phase $\phi 1$ applied to control conductor 532 of the propeller pitch motor control circuit for the right engine, applied under the control of the throttle rheostat 705, becomes greater than the potential of phase $\phi 2$ applied to conductor 532 under the control of the propeller governor rheostat 715, the motor 534 is operated to rotate shaft 530 and through the gears 621 to rotate shaft 622 in a direction to move the sliders of the potentiometers controlled thereby away from the No. 1 terminals of their windings.

As a result of the movement of the slider of potentiometer RPP1, the resistance of the branch of the resistance network including the winding of such potentiometer is decreased resulting in a decrease in the phase $\phi 1$ potential applied to the control conductor 532 until it again becomes equal to the potential of phase $\phi 2$ applied to control conductor 532 by the propeller governor rheostat 715. The reduction by the propeller pitch potentiometer RPP1 of the potential applied to the signal input conductor 400 of the RPM motor control circuit will result in the limiting of the potential of phase $\phi 1$ applied to the control conductor 400 to a value which will not permit the motor thereof to adjust the potentiometers controlled thereby to positions indicative of an engine speed greater than that called for by the setting of the propeller governor which has been set for MAX-RPM for an engine speed of 2600 revolutions per minute. The resistance introduced into one branch of the resistance network by the throttle controlled rheostat 705 increases as the throttle is opened beyond 50 per cent opening thereby tending to increase the potential of phase $\phi 1$ applied to the signal input conductor 400 to a value which would produce a speed indication of greater than 2600 revolutions per minute but the propeller pitch potentiometer RPP1 reduces the resistance of another branch of the resistance network to reduce the potential of phase $\phi 1$ applied to the conductor 400.

As the speed and manifold pressure of the simulated right engine increase, the RPM potentiometer RRP1 and the manifold pressure potentiometer RMP1 are affected to cause an increase in the potential of phase $\phi 1$ applied to the signal input conductor 207 of the brake horsepower motor control circuit for the right engine, whereupon the motor of this circuit is controlled to adjust the potentiometers driven by the shafts 130 and 211 into new positions representative of the horse-power developed by the right engine at the indicated speed of 2600 revolutions per minute and at the indicated manifold pressure of 44 inches of mercury. The brake horse-power motor control circuit for the left engine is similarly controlled.

A further result of the increase of the simulated engine speed and the simulated increase in the propeller pitch by the movement of the sliders of the propeller pitch potentiometers away from the No. 1 or minimum pitch positions is the readjustment of the potentiometers of the propeller slip ratio motor unit to new settings representative of the propeller efficiency at the new speed, which propeller efficiency is a factor in determining the thrust horse-power output of the propeller. The propeller slip ratio may be expressed by the equation $$PSR = 1 - \frac{V}{N*D(PP)}$$

where
V is the true air speed
PP is the propeller pitch
N is the number of turns per minutes made by the propeller
D is the diameter of the propeller.

From the foregoing equation, it will appear that the propeller slip ratio varies directly as the true air speed, inversely as the RPM and inversely as the propeller pitch. The integration of this equation may be approximated closely enough for the purposes of the invention by the circuits shown in the upper portion of Fig. 2 in which the function V is introduced by the true air speed variac TASV1, the function N is introduced by the RPM potentiometer RRP2 and the function PP is introduced by the propeller pitch potentiometer RPP3.

It will be recalled that potential of phase $\phi 2$ is applied to the signal input conductor 220 of the propeller slip ratio motor control circuit under the control of the true air speed variac TASV1 and under the control of the propeller pitch potentiometer RPP3 and that potential of phase $\phi 1$ is applied to conductor 220 under the control of the RPM potentiometer RRP2 and the propeller slip ratio balancing potentiometer RPS8 and that until the engine speed was increased above the idling speed, with the slider of potentiometer RPP3 at the No. 1 terminal of its winding, the potential of phase $\phi 2$ predominated on control conductor 220 to hold the sliders of the propeller slip ratio potentiometers from advancing away from the No. 1 terminals of their windings.

As the speed of the engine increases to 2600 revolutions per minute, the slider of the RPM potentiometer RRP2 is advanced toward the No. 3 terminal of its winding thereby increasing the potential of phase $\phi 1$ applied to control conductor 220. Also as the propeller pitch is increased the slider of the propeller pitch potentiometer RPP3 is advanced away from the No. 1 terminal of its winding, thereby decreasing the potential of phase $\phi 2$ applied to conductor 220. As a result of the summation of these potentials, the motor 112 of the propeller slip ratio motor control circuit operates to rotate shaft 216 in such a direction as to move the sliders of the potentiometers controlled thereby towards the No. 3 terminals of their windings. As the slider of potentiometer RPS8 advances over its winding, the potential of phase $\phi 1$ applied thereover to control conductor 220 becomes reduced until it balances the potential of phase $\phi 2$ at which time the motor will stop and potentiometers RPS6 and RPS7 will have been adjusted to positions commensurate with the propeller efficiency at the assumed speed of 2600 revolutions per minute and at the assumed propeller pitch.

As the sliders of potentiometers RPS6 and RPS7 move away from the No. 1 terminals of their windings, their combined resistance to ground first increases from zero to a maximum when the sliders have moved about 30 degrees away from their No. 1 terminals and then as the sliders advance further, the combined resistance decreases again to zero. As the resistance increases the phase $\phi 1$ potential derived at the slider of the brake horse-power variac RPV7 which is available for application to the signal input conductor 606 of the thrust horse-power motor control circuit increases. In a similar manner as the RPM of the left engine increases the propeller slip ratio motor control circuit appertaining to the left engine propeller is controlled to advance the sliders of the potentiometers controlled thereby away from the No. 1 terminals of their windings and the potentiometers LPS6 and LPS7 cause first an increase and then a decrease in the potential of phase $\phi 1$ derived at the slider of the left engine brake horse-power variac LBV7 and applied to the control conductor 606.

The summation of the potentials of phase $\phi 1$ applied to the signal input conductor 606 of the thrust horse-power motor control circuit is determined by the brake horse-power outputs of the engines as modified by the efficiency of the propellers which they drive. In response to the summation of these potentials the thrust horse-power motor control circuit causes the motor 512 thereof to drive the shaft 510 and through the unity ratio bevel gears 609 to drive the shaft 610 until the slider of the balancing potentiometer TP9 driven by the shaft 610 has assumed such a position that the potential of phase $\phi 2$ applied thereover and through resistance 611 to control conductor 606 balances the summation of the phase $\phi 1$ potentials applied to conductor 606. When this condition of balance is reached the motor stops. The winding of potentiometer TP9 is energized by potential of phase $\phi 2$ applied from the 40$\phi 2$ bus bar through resistance 612 and the winding of the potentiometer in parallel with resistance 613 to ground.

As fully described in the application of Lukacs and Strickler hereinbefore referred to, potentiometers driven from the shaft 610 of the thrust horse-power motor unit are effective to control the indicated air speed and in turn the true air speed motor control circuits of the trainer to indicate that in response to the full opening of the engine throttles, the movement of the aircraft over the water is being simulated. With the increase in true air speed the slider of the true air speed variac TASV1 is moved further toward the No. 4 terminal of its winding thereby increasing the potential of phase $\phi 2$ applied to the control conductor 220 of the propeller slip ratio motor control circuit. Since, however, the engine RPM has been increasing at the same time to produce the increasing air speed, the slider of the RPM potentiometer RRP2 will be advanced toward the No. 3 terminal of its winding to cause an increase in the potential of phase $\phi 1$ applied to the control conductor 220 and with the increase of engine speed the propeller pitch potentiometer RPP3 will have become adjusted in response to the operation of the propeller pitch motor control circuit to simulate the adjustment of the propeller pitch to prevent the engine speed from exceeding 2600 revolutions per minute regardless of the amount of throttle opening. As a consequence the changing potentials of phase $\phi1$ and phase $\phi2$ applied to control conductor 220 will tend to balance each other and prevent the operation of the propeller slip ratio motor control circuit.

However, should the engine speed represented by the potentiometer RRP2 increase at a rate faster than the rate of increase in true air speed represented by the variac TASV1, then the potential of phase $\phi1$ applied to conductor 220 under the control of potentiometer RRP2 will increase at a faster rate than the potential of phase $\phi2$ applied to conductor 220 under the control of variac TASV1 and the propeller slip ratio motor control circuit will operate to advance the sliders of the potentiometers operated thereby towards the No. 1 terminals of their windings indicative of a reduction in the propeller efficiency, which will, through the potentiometers RPS6 and RPS7, cause the reduction in the thrust horse-power output and consequently a reduction in the indicated air speed.

When an air speed sufficient for take-off has been attained the altimeter of the trainer will indicate that the take-off has been simulated. For most efficient climbing in the type of airplane which is being simulated, engine speeds of 2400 revolutions per minute at manifold pressures of about 38 inches of mercury are required. To simulate these conditions the pilot reduces the throttle openings. The reduction of the throttle opening for the right engine reduces the potential of phase $\phi1$ applied as previously described under the control of the throttle controlled rheostats 706 and 707 to the signal input control conductor 407 of the manifold pressure motor control circuit whereupon the motor 354 thereof is operated by the predominating potential of phase $\phi2$ applied over the balancing potentiometer RMP5 to move the sliders of the potentiometers driven by the shaft 422 until the potential of phase $\phi2$ applied by the potentiometer RMP5 balances the signal potential of phase $\phi1$. At such time the motor 354 will have adjusted the potentiometers driven thereby to positions indicative of the reduction in manifold pressure incident to the reduction in throttle opening. Manifold pressure indicators on the instrument panels will now show the reduced manifold pressure of the right engine. The reduction of the throttle opening for the left engine causes the manifold pressure motor control circuit for the left engine (not shown) to function similarly. The pilot will continue the gradual closures of the engine throttles until the manifold pressure indicators show manifold pressures for the two engines of about 38 inches of mercury.

The reduction in the throttle openings at the same time reduces the engine speeds as indicated by the tachometers on the instrument panels. For example, in response to the reduction of the throttle opening for the right engine, the throttle controlled rheostat 705 is effective to cause a decrease in the phase $\phi1$ potential applied to the signal input conductors 400 and 532 of the RPM and propeller pitch motor control circuits. The decrease in potential of phase $\phi1$ applied to the signal input conductor 400 results in the potential of phase $\phi2$ applied to such conductor by the balancing potentiometer RRP10 controlling the motor 314 of the RPM motor control circuit to move the sliders of the potentiometers and variacs driven by the shaft 402 toward the No. 1 terminals of their windings indicative of a reduction in the speed of the right engine. The decrease in potential of phase $\phi1$ applied to the signal input conductor 532 results in the potential of phase $\phi2$ applied to such conductor under the control of the propeller governor rheostat 715 controlling the motor 534 of the propeller pitch motor control circuit to move the sliders of the potentiometers driven by the shaft 622 toward the No. 1 terminals of their windings indicative of a reduction in propeller pitch which, under the control of the propeller pitch potentiometer RPP1, would tend to maintain the engine speed at the speed of 2600 revolutions per minute called for by the instant setting of the propeller governor control 700. In a similar manner the RPM and propeller pitch motor control circuits appertaining to the left engine are controlled in response to the operation of the left engine throttle.

To simulate the reduction of the engine speeds to the most efficient speeds of 2400 revolutions per minute for climbing, the pilot operates the propeller governor controls toward their reduced RPM positions. The readjustment of the governor control 700 for the right engine moves the slider of rheostat 715 away from the No. 3 terminal of its winding thereby decreasing the potential of phase $\phi2$ applied thereover to the signal input conductor 532 of the propeller pitch motor control circuit. With the right engine throttle previously operated to a position in which the manifold pressure indication is 38 inches of mercury and the potential of phase $\phi1$ applied to control conductor 532 under the control of the throttle control rheostat 705 thus reduced, the motor 534 of the propeller pitch motor control circuit will be controlled to move the sliders of the potentiometers driven thereby until the slider of potentiometer RPP1 reaches a position in which the potential of phase $\phi1$ balances the potential of phase $\phi2$ when the motor will stop. The propeller governor control is thus adjusted to a position in which the slider of potentiometer RPP1 is moved to a position in which the potential of phase $\phi1$ applied to the signal input conductor 400 of the RPM motor control circuit is such as to cause the latter circuit to set the sliders of the potentiometers controlled thereby into positions in which the right engine tachometers indicate an engine speed of 2400 revolutions per minute. The adjustment of the propeller governor for the left engine results in a similar control of the propeller pitch motor control circuit for the left engine (not shown) to cause the left engine tachometers to indicate an engine speed of 2400 revolutions per minute.

The interaction between the RPM, propeller pitch, brake horse-power, thrust horse-power, true air speed and propeller slip ratio motor control circuits will take place in the manner previously described.

When the pilot ascertains from the altimeter reading that the simulated flight has reached the desired altitude he will, in order to level off for efficient cruising, reduce the engine speeds to about 1900 revolutions per minute at manifold pressures of 27 inches of mercury. To simulate these conditions the pilot first reduces the throttle openings. The reduction of the throttle opening for the right engine reduces the potential of phase $\phi1$ applied as previously described under the control of the throttle controlled rheostats 706 and 707 to the signal input conductor 407 of the manifold pressure motor control circuit whereupon the motor 354 thereof is operated by the predominating potential of phase φ2 applied over the balancing potentiometer RMP5 to move the sliders of the potentiometers driven by the shaft 422 until the potential of phase φ2 applied by the potentiometer RMP5 balances the signal potential of phase φ1. At such time the motor 354 will have adjusted the potentiometers driven thereby to positions indicative of the reduction in manifold pressure incident to the reduction in throttle opening. Manifold pressure indicators on the instrument panels will now show the reduced manifold pressure of the right engine. The reduction of the throttle opening for the left engine causes the manifold pressure motor control circuit for the left engine (not shown) to function similarly. The pilot will continue the gradual closure of the engine throttles until the manifold pressure indicators show manifold pressures of about 24 inches of mercury, or slightly lower than the pressures at which the engine should operate for most efficient operation.

The reduction in the throttle openings at the same time reduces the engine speeds as indicated by the tachometers on the instrument panels. For example, in response to the reduction of the throttle opening for the right engine the throttle controlled rheostat 705 is effective to cause a decreases in phase φ1 potential applied to the signal input conductors 400 and 532 of the RPM and propeller pitch motor control circuits. The decrease in potential of phase φ1 applied to the signal input conductor 400 results in the potential of phase φ2 applied to such conductor by the balancing potentiometer RRP10 controlling the motor 314 of the RPM motor control circuit to move the sliders of the potentiometers and variacs driven by the shaft 402 toward the No. 1 terminals of their windings indicative of a reduction in the speed of the right engine. The decrease in potential of phase φ1 applied to the signal input conductor 532 results in the potential of phase φ2 applied to such conductor under the control of the propeller governor rheostat 715 controlling the motor 534 of the propeller pitch motor control circuit to move the sliders of the potentiometers driven by shaft 622 toward the No. 1 terminals of their windings indicative of a reduction in propeller pitch which, under the control of the propeller pitch potentiometer RPP1, would tend to maintain the engine speed at the speed of 2400 revolutions per minute called for by the instant setting of the propeller governor control 700. In a similar manner the RPM and propeller pitch motor control circuits appertaining to the left engine are controlled in response to the operation of the left engine throttle.

To simulate the maintenance of the engine speeds at the most efficient speeds of 1900 revolutions per minute for cruising, the pilot operates the propeller governor controls further towards their reduced RPM positions. The readjustment of the governor control 700 for the right engine moves the slider of rheostat 715 further toward the No. 1 terminal of its winding hereby decreasing the potential of phase φ2 applied thereover to the signal input conductor 532 of the propeller pitch motor control circuit. With the right engine throttle previously operated to a position in which the manifold pressure indication is 24 inches of mercury and the potential of phase φ1 applied to control conductor 532 under the control of the throttle control rheostat 705 thus reduced, the motor 534 of the propeller pitch motor control circuit will be controlled to move the sliders of the potentiometers driven thereby until the slider of potentiometer RPP1 reaches a position in which the potential of phase φ1 balances the potential of phase φ2 when the motor will stop. The propeller governor control is thus adjusted to a position in which the slider of potentiometer RPP1 is moved to a position in which the potential of phase φ1 applied to the signal input conductor 400 of the RPM motor control circuit is such as to cause the latter circuit to set the sliders of the potentiometers controlled thereby into positions in which the right engine tachometers indicate an engine speed of 1900 revolutions per minute. The adjustment of the propeller governor control of the left engine results in a similar control of the propeller pitch motor control circuit for the left engine (not shown) to cause the left engine tachometers to indicate an engine speed of 1900 revolutions per minute.

As a result of the setting of the RPM potentiometers to positions representative of a reduction of the engine speeds to 1900 revolutions per minute, controls are exercised over the manifold pressure motor control circuits whereby such latter circuits are effective to cause the manifold pressure indicators to show increases in manifold pressure from 24 inches of mercury to 27 inches of mercury. Ordinarily, a reduction in throttle opening and consequently in RPM would result in a reduction in manifold pressure but in the actual airplane which the trainer of the present invention simulates there are situations notably when the engine manifold pressure and RPM are reduced from climb-to cruising values and to a lesser extent when they are reduced from take-off to climbing values, that the reduction in RPM results in an increase in manifold pressure. To simulate these conditions the potential of phase φ1 which is applied to the signal input conductor 407 of the manifold pressure motor control circuit is applied over two circuits as previously described, one of which is under the control of the throttle controlled rheostat 706 and the RPM potentiometer RRP3 and is effective to cause the potential of phase φ1 applied to control conductor 407 to increase until the throttle is about 45 per cent open and to thereafter decrease to zero when the throttle is 100 per cent open. The potential of phase φ1 applied over the other circuit to control conductor 407 under the control of the throttle rheostat 707 and the RPM potentiometer RRP5, is caused to increase as the throttle opening is increased, and to decrease as the throttle opening is decreased. The effect of the summation of these potentials is that above 75 per cent throttle opening their summation will be greater for a take-off engine speed of 2600 revolutions per minute than for a climbing engine speed of 2400 revolutions per minute and greater for a climbing engine speed of 2400 revolutions per minute than for a cruising engine speed of 1900 revolutions per minute but below 75 percent throttle opening the summation of the phase φ1 potentials will be slightly greater for a climbing engine speed of 2400 revolutions per minute than for a take-off engine speed of 2600 revolutions per minute and considerably greater for a cruising engine speed of 1900 revolutions per minute than for a climbing engine speed of 2400 revolutions per minute. As a consequence the closure of the throttle to 75 per cent opening resulting in the reduction of engine speed causes a reduction of manifold pressure as the engine speed is reduced from take-off speed to climbing speed and a further reduction as the engine speed is reduced from climbing speed to cruising speed and the further throttle closure resulting in the reduction of engine speed causes an increase of manifold pressure as the engine speed is reduced from take-off speed to climbing speed and a further increase of manifold pressure as the engine speed is reduced from climbing speed to cruising speed.

*High speed operation of supercharger blowers*

To simulate the high speed operation of the supercharger blowers which would be required for a higher altitude flight of an aircraft the flight engineer operates the supercharger switches for the two engines, such as 750 from their low to their high speed settings. The operation of switch 750 establishes a circuit from ground over conductor 751 through the winding of the SHR (supercharger high speed relay for the right engine) 423 to battery and ground. Relay 423 upon operating closes an obvious circuit for the SHR1 relay 424 which also operates. The SHR1 relay affects the manifold pressure motor control circuit to cause an increase of the indicated manifold pressure for the right engine to simulate the increase in manifold pressure which would result in an aircraft by increasing the speed of the supercharger blower. A higher potential of phase ϕ1 is now applied to signal input conductor 407 for the right engine.

To derive this potential, potential of phase ϕ1 is applied from bus bar 40ϕ1 to conductor 439 as previously described under the control of the throttle controlled rheostat 707, the altitude potentiometer AP4 and the ON relay 316 of the RPM motor control circuit, thence over the middle upper front contact of the SHR1 relay 424, through the winding of the RPM potentiometer RRP5, over the inner lower front contact of relay 424 and through resistance 435 to ground. With relay 424 operated, the left half of the winding of potentiometer RRP5 is bridged over the inner upper contact of relay 424 through resistance 436. From the slider of potentiometer RRP5, the derived potential of phase ϕ1 is applied over the lower front contact of relay 424 to conductor 741 and thence over the circuit previously traced to the signal input conductor 407. The change in the resistance network caused by the operation of relay 424 is therefore effective to cause an increase of the potential applied to conductor 407 above the potential applied prior to the operation of such relay. Similarly, the potential of phase ϕ1 applied to the control conductor of the manifold pressure motor control circuit for the left engine is increased.

It will be noted that with relay 424 operated, the left half of the winding of the RPM potentiometer RRP5 is short-circuited through the resistance 436. This is to cause the manifold pressure to increase at one rate at lower engine speeds when the slider is engaging with the shunted half of the winding and to increase at a higher rate when the slider is engaging the unshunted half of the winding in simulation of the manner in which the manifold pressure varies in accordance with the RPM when the supercharger is being operated at high speed. A similar simulation is effected for the left engine.

The manifold pressure motor control circuits are thereupon operated to cause the rotation of the shafts driven thereby indicative of increases in manifold pressures and to cause the manifold pressure indicators on the instrument panels to show such increases. The manifold pressures are now varied with the altitude under the control of the altimeter potentiometers, such as AP4 and varied in accordance with the opening and closing of the throttles.

As a further result of the operation of the SHR relay 423, the circuit previously traced for applying potential of phase ϕ1 to the signal input conductor 207 for the brake horsepower motor control circuit for the right engine is changed to simulate the reduction of the brake horse-power output of the engine of an aircraft due to the extra power consumed in running the supercharger blower at a higher speed. With relay 423 now operated, potential of phase ϕ1 is applied from the slider of manifold pressure potentiometer RMP4, over conductor 204, over the middle lower front contact of relay 423, through resistance 437, over conductor 432 to the slider of the RPM potentiometer RRP1 and over the potential divider extending from ground through the RRP1 potentiometer winding, over conductor 205, over the lower front contact of relay 423 and through resistance 434 to ground and from a point between resistance 437 and this potential divider through resistance 206 to the control conductor 207 of the brake horse-power motor control circuit for the right engine. A similar circuit is established to the control conductor of the brake horse-power motor control circuit for the left engine. These motor control circuits are now controlled by the manifold pressure potentiometers for their respective engines, such as RMP4, and the RPM potentiometers for the respective engines, such RRP1, to show an increase in the brake horse-powers as the manifold pressures increase and an increase in the brake horse-powers as the engine speeds increase, but as the engine speeds increase above a certain amount, the resistance networks cause the brake horse-powers to fall off as would be the case in an actual airplane.

As a result of the increase in manifold pressures due to the simulation of the increased speeds of the supercharger blowers and the increase in the simulated brake horse-power outputs of the engines, the thrust horse-power motor control circuit of Fig. 5 is controlled to rotate shaft 510 into a position indicative of an increase in such thrust horse-power thereby causing an increase in the indicated air speed as fully disclosed in the application of Davis-Forgarty-Rippere, hereinbefore referred to.

*Manual propeller pitch control*

It will now be assumed that the right and left propeller control switches, such as 710, are operated from their upper or automatic positions to their open or manual positions, thereby opening the circuit of the AUTO relay 804 at the engine control circuit of Fig. 8 appertaining to the right engine, and opening the similar circuit in the engine control circuit for the left engine (not shown). These relays thereupon release causing the operation of the associated MAN relays, such as 805. Relay 805 upon operating opens at its lower back contact, the previously traced circuit over which potential of phase ϕ1 was applied to the signal input control conductor 532 of the propeller pitch motor control circuit and connects such conductor 532 through resistance 825 and over the lower front contact of relay 805 to ground. Relay 805 also transfers the circuit previously traced to control conductor 532 through resistance 806 from the slider of the propeller governor rheostat 715 to contacts under the control of the increase RPM relay 842, to contacts under the control of the decrease RPM relay 843 and to contacts under the control of the FTR1 feather relay 844. The propeller pitch motor control circuit is now no longer responsive to the propeller governor control 700 or to changes in the manifold pressure as represented by the movement of the slider of the manifold pressure potentiometer RMP1, to changes in the throttle opening as represented by the movement of the slider of the throttle rheostat 705 and to changes in the true air speed as represented by the movement of the slider of the true air speed potentiometer TASP5. The operation of the MAN relay of the left engine control circuit functions in a similar manner.

*Decrease of propeller pitch*

The simulation of the decrease of the right engine propeller pitch under manual control is controlled by the movement of the control switch 710 to its middle position. With the switch in its middle position, ground is connected thereover, over conductor 846 through the winding of INC relay 842 to battery and ground. Relay 842 upon operating applies potential of phase $\phi 2$ from the junction point between the resistances 848 and 849 of the potential divider comprising such resistances, over the inner upper front contact of relay 842, over the upper front contact of the MAN relay 805, through resistance 806 to the signal input conductor 532 of the propeller pitch motor control circuit. The propeller pitch motor control circuit is now operated to rotate shaft 622 in a direction indicative of the decrease of propeller pitch so long as the switch 710 is held in the propeller RPM increase position. The rotation of shaft 622 rotates the sliders of the propeller pitch potentiometers toward the No. 1 terminals of their windings resulting in the setting of the slider of potentiometer RPP1 in a position to cause an increase in the potential of phase $\phi 1$ applied to the signal input conductor 400 of the RPM motor control circuit and the consequent increase in the indicated RPM. When the right engine tachometer shows a desired engine speed, the switch 710 is moved to its open position in which the INC relay 842 releases and opens the circuit for controlling the propeller pitch motor control circuit whereupon the motor thereof comes to rest. The propeller pitch of the propeller of the left engine may be similarly controlled.

*Increase of propeller pitch*

The simulation of the increase of the right engine propeller pitch under manual control is controlled by the movement of the control switch 710 to its lower position. With the switch in its lower position ground is connected thereover, over conductor 847 through the winding of the DEC relay 843 to battery and ground. Relay 843 upon operating applies potential of phase $\phi 1$ from the junction point between resistances 850 and 851 of the potential divider comprising such resistances, over the inner upper front contact of relay 843, over the upper front contact of the MAN relay 805 through resistance 806 to the signal input control conductor 532 of the propeller pitch motor control circuit. The propeller pitch motor control circuit is now operated to rotate shaft 622 in a direction indicative of an increase of propeller pitch so long as the switch 710 is held in the propeller RPM decrease position. The rotation of shaft 622 rotates the sliders of the propeller pitch potentiometers toward the No. 3 terminals of their windings resulting in the setting of the slider of potentiometer RPP1 in a position to cause a decrease in the potential of phase $\phi 1$ applied to the signal input conductor 400 of the RPM motor control circuit and a consequent reduction in the indicated RPM. When the right engine tachometer shows a desired engine speed, the switch 710 is moved to its open position in which the DEC relay 843 releases and opens the circuit for controlling the propeller pitch motor control circuit whereupon the motor thereof comes to rest. The pitch of the propeller of the left engine may be similarly controlled.

Should the pilot hold the pitch control switch 710 too long in its lower position, the motor 534 will rotate shaft 530 until the sliders of the potentiometers controlled thereby will have been moved 142 degrees or more away from the No. 1 terminals of their windings at which time the cam 537 carried by the shaft 530 will cause the closure of the NUL contacts. Such contacts upon closing establish a circuit from ground thereover over the outer left back contact of the RV1 relay 533, over conductor 853, over the lower back contact of the INC relay 842, over the lower back contact of the FTR1 relay 844, over the lower back contact of the DEC relay 843, over conductor 854 to battery through the winding of the LS relay 536. Relay 536 is thus operated as soon as the DEC relay 843 releases if the pitch control switch is opened at any time after the cam 537 has operated the NUL contacts signifying a maximum operative pitch condition and arrests further operation of the motor 534.

*Feathering the propeller blades*

Should the right engine be disabled, the simulation of which disabling may be controlled by the opening of the disable key 722 by the instructor, the pilot will simulate the feathering of the blades of the right engine propeller to remove the drag imposed by the wind-milling of the disabled engine, by closing the propeller feathering switch 746. The closure of this switch establishes a circuit from ground thereover, over conductor 852 through the FTR1 relay 844 to battery and ground. Relay 844, upon operating, establishes over its lower front contact an obvious circuit for the FTR relay 829 and over its inner upper front contact applies potential of phase $\phi 1$ from the junction point between resistances 850 and 851 of the potential divider comprising such resistances, over the inner upper front contact of relay 844, over the upper front contact of the MAN relay 805 and through resistance 806 to the signal input conductor 532 of the propeller pitch motor control circuit. The propeller pitch motor control circuit is now operated to rotate shaft 530 in a direction representative of an increase in propeller pitch. When the pitch has been increased to a point where the NUL switch is operated, the LS relay 536 is not operated to stop the motor 534 because at this time the circuit therefor extending as previously traced from ground over the contacts of the switch NUL, over the outer left back contact of relay 533, over conductor 853, over the lower back contact of relay 842, over the lower back contact of relay 844, over the lower back contact of relay 843 and over conductor 854 to battery and ground through the winding of the LS relay 536 is open at the back contact of the FTR1 relay 844 which is being held operated by the feather key 746 and therefore the motor 536 continues in operation.

As soon as the shaft 530 has rotated to a position in which the sliders of the potentiometers driven therefrom approach the No. 3 terminals of their windings, the cam 538 carried by the shaft operates the limit switch L2 to open the stator circuit of the motor 534 and to establish an obvious circuit for the FTR relay 539 which, upon operating establishes an obvious circuit for the LS relay 526 which latter relay, upon operating opens the rotor circuit of the motor 534. The motor now comes to rest at which time the sliders of the potentiometers driven therefrom are set into positions representative of a feathered condition of the propeller blades. Relay 539 also establishes circuits from ground over its left contacts and conductors 845 and 855 for holding the MAN relay 805 and FTR relay 829 operated regardless of the continued closure of the feather key 741 and the continued opening of the pitch control switch 710. The circuit from conductor 845 extends over the inner upper front contact and through the winding of relay 805 to battery and ground and the circuit from conductor 855 extends through the winding of relay 829 to battery and ground.

With the slider of the propeller pitch potentiometer RPP1 now at the No. 3 terminal of its winding, ground potential is connected from the slider of such potentiometer over the circuit previously traced to the signal input control conductor 400 and with potential of phase $\phi 2$ connected to such conductor 400 through resistance 412 under the control of the RPM balancing potentiometer RRP10, motor 314 of the RPM motor control circuit is controlled to rotate the shaft 402 in such a direction as to return the sliders of all potentiometers and variacs driven therefrom to the No. 1 terminals of their windings in which the L1 limit switch will open the circuit of the "on" relay 316 and the circuit of the driving motor of the motor control circuit will be opened to stop further rotation of the shaft 402. The return of the RPM motor unit shaft 402 to its normal position is instrumental in causing the right engine tachometers to show zero engine speed and to stop the simulation of engine noise and vibration for the right engine. In response to the release of relay 316, the circuits controlled thereby function in the manner fully described in the Lukacs and Strickler applications hereinbefore referred to simulate the effects which are produced by the disabling of the right engine. The left engine propeller may be feathered in a similar manner.

What is claimed is:

1. In an aircraft trainer wherein the operation of an airplane engine is simulated, a source of current, a control conductor, means for deriving a potential from said source commensurate with the true air speed of the simulated flight, a potentiometer for modifying said potential in accordance with the reciprocal of the amount of pitch of the blades of the propeller driven by the simulated engine, means for deriving a second and oppositely phased potential from said source which varies in accordance with the speed of rotation of the propeller driven by the simulated engine, a balancing potentiometer for modifying said latter potential and for applying it to said conductor, a motor responsive to an unbalanced potential condition on said conductor for adjusting said latter potentiometer until the sum of the potentials applies to said conductor becomes zero, and means operated by said motor for introducing integration factors into other motor control circuit networks in the trainer in accordance with the quantity representing the propeller slip ratio.

2. In an aircraft trainer wherein the operation of an airplane engine is simulated, a source of current, a control conductor, means for deriving a potential from said source commensurate with the true air speed of the simulated flight, a potentiometer for modifying said potential in accordance with the reciprocal of the amount of pitch of the blades of the propeller driven by the simulated engine, means for deriving a second and oppositely phased potential from said source which varies in accordance with the speed of rotation of the propeller driven by the simulated engine, a balancing potentiometer for modifying said latter potential and for applying it to said conductor, the summation of said potentials having the value $$\frac{V}{N\pi D\,(PP)}$$

where V is the velocity or true airspeed, N is the number of revolutions per minute of the propeller so that $N\pi D$ represents the peripheral speed of the propeller, D is the diameter of the propeller and PP is the pitch of the propeller and the summation potential varying directly as the air speed, inversely as the propeller speed in revolutions per minute and inversely as the propeller pitch, a motor responsive to an unbalanced potential condition on said conductor for adjusting said latter potential until the sum of the potentials applies to said conductor becomes zero, and means operated by said motor for introducing integration factors into other motor control circuit networks in the trainer in accordance with the quantity $$\frac{V}{N\pi D\,(PP)}$$

3. In an aircraft trainer wherein the operation of an airplane engine is simulated, a source of current, a control conductor, means for deriving a potential from said source which varies with the quantity $$\frac{V}{N\pi D\,(PP)}$$

and for applying said potential to said conductor, where V of said quantity is the velocity or true airspeed, N is the number of revolutions per minute of the propeller, D is the diameter of the propeller so that $N\pi D$ represents the peripheral speed of the propeller and PP is the pitch of the propeller, a balancing potentiometer for deriving an oppositely phased potential from said source and for applying it to said conductor, a motor responsive to an unbalanced potential condition on said conductor for adjusting said balancing potentiometer until the sum of the potentials applied to said conductor becomes zero, and means controlled by said motor for introducing integration factors into other motor control circuit networks of the trainer in simulation of the effects incident to the efficiency of the propeller as determined by the quantity $$\frac{V}{N\pi D\,(PP)}$$

4. In an aircraft trainer wherein the operation of an aircraft engine is simulated, a source of current, a control conductor, means for deriving a potential from said source commensurate with the brake horse-power output of the simulated engine, a potentiometer for modifying said potential in accordance with the efficiency quantity $$\frac{V}{N\pi D\,(PP)}$$

of the engine driven propeller and for applying said potential to said conductor, where V of said quantity is the velocity or true air speed, N is the number of revolutions per minute of the propeller, D is the diameter of the propeller so that ($N\pi D$) represents the peripheral speed of the propeller, and PP is the pitch of the propeller, a balancing potentiometer for deriving a potential from said source and for applying it to said conductor, a motor responsive to an unbalanced potential condition on said conductor for adjusting said balancing potentiometer until the sum of the potentials applied to said conductor becomes zero, and means operable by said motor for introducing integration factors into other motor control circuit networks of the trainer indicative of the thrust horse-power output of the propeller driven by the simulated engine.

5. In an aircraft trainer wherein the operation of the engine of a multi-engine airplane is simulated, a source of current, a control conductor, means for deriving a potential from said source commensurate with the brake horse-power output of one of the simulated engines, a potentiometer for modifying said potential in accordance with the $$\frac{V}{N\pi D\,(PP)}$$

efficiency of said engine and for applying said potential to said conductor, where V of said quantity is the velocity or true airspeed, N is the number of revolutions per minute of the propeller, D is the diameter of the propeller so that $N\pi D$ represents the peripheral speed of the propeller and PP is the pitch of the propeller, similar means for deriving and applying a potential to said control conductor for each of the other simulated engines, a balancing potentiometer for deriving a potential from said source and for applying it to said conductor, a motor responsive to an unbalanced potential condition on said conductor for adjusting said balancing potentiometer until the sum of the potentials applied to said conductor becomes zero, and means operable by said motor for introducing integration factors into other motor control circuit networks of the trainer indicative of the total thrust horsepower output of the propellers driven by the sumulated engines.

6. In an aircraft trainer wherein the operation of an airplane engine is simulated, a propeller governor control, a throttle control, a source of current, a control conductor, a rheostat operated by said governor control for deriving a potential from said source which varies with the setting of said control and for applying it to said conductor, a potentiometer for deriving a potential from said source which varies with the manifold pressure of the simulated engine, a potentiometer for modifying said latter potential in accordance with the true air speed of the simulated flight, a rheostat controlled by said throttle control for further modifying said potential, a balancing potentiometer for modifying the potential derived from said manifold pressure potentiometer and for applying it to said conductor, a motor responsive to an unbalanced potential condition on said conductor for adjusting said balancing potentiometer until the sum of the potentials applied to said conductor becomes zero, and means controlled by said motor for introducing integration factors into other motor control circuit networks of the trainer commensurate with the automatic change in the propeller pitch required to maintain a constant engine speed regardless of throttle opening.

7. In an aircraft trainer wherein the operation of an airplane engine is simulated, a propeller governor control, a throttle control, a source of current, a control conductor, a rheostat operated by said governor control for deriving a potential from said source which varies with the setting of said control and for applying said potential to said conductor, a potentiometer for deriving a potential from said source which varies with the manifold pressure of the simulated engine, a potentiometer serially connected with the winding of said latter potentiometer for varying the energization of said winding from said source in accordance with the true air speed of the simulated flight, a resistance network connected in shunt of a portion of the winding of said manifold pressure potentiometer comprising a fixed resistance and a rheostat operable by said throttle control whereby the potential derived from said manifold pressure potentiometer varies in accordance with the operation of said throttle control at two different rates, a balancing potentiometer for modifying the potential derived from said manifold pressure potentiometer and for applying it to said conductor, a motor responsive to an unbalanced potential condition on said conductor for adjusting said balancing potentiometer until the sum of the potentials applied to said conductor becomes zero, and means controlled by said motor for introducing integration factors into other motor control networks of the trainer commensurate with the automatic change in the propeller pitch required to maintain a constant engine speed regardless of throttle opening.

8. In an aircraft trainer wherein the operation of an airplane engine is simulated, a source of current, a control conductor, a relay, a switch at the pilot's station of said trainer for causing the operation of said relay indicative of the fact that the manual control of the pitch of the blades of the airplane propeller is being simulated, a second relay operable when said switch is operated to its propeller RPM decrease position effective to apply potential from said source to said conductor, a motor rotatable in one direction in response to said potential while said switch is operated to the propeller RPM decrease position, means operable by said motor for introducing integration factors into other motor control circuit networks of the trainer commensurate with the amount of the simulated increased propeller pitch, and means operable by said motor for causing the operation of said motor to be arrested regardless of the continued operation of said switch to its propeller RPM decrease position when the increase in the propeller pitch to the operative maximum is simulated.

9. In an aircraft trainer wherein the operation of an airplane engine is simulated, a source of current, a control conductor, a relay, a switch at the pilot's station of said trainer for causing the operation of said relay indicative of the fact that the manual control of the pitch of the blades of the airplane propeller is being simulated, a second relay operable when said switch is operated to its propeller RPM decrease position effective to apply potential from said source to said conductor, a motor rotatable in one direction in response to said potential while said switch is operated to its propeller RPM decrease position, means operable by said motor for introducing integration factors into other motor control circuit networks of the trainer commensurate with the amount of the simulated increase in propeller pitch, a relay for arresting the operation of said motor, a cam rotatable by said motor, and contacts closable by said cam to establish the circuit of said latter relay whereby the operation of said motor is arrested regardless of the continued operation of said switch to its propeller RPM decrease position when the increase of the propeller pitch to the operative maximum is simulated.

10. In an aircraft trainer wherein the operation of an airplane engine is simulated, a source of current, a control conductor, a relay, a switch at the pilot's station of said trainer for causing the operation of said relay indicative of the fact that the manual control of the pitch of the blades of the airplane propeller is being simulated, a feathering key at said pilot's station, a second relay operable in response to the operation of said feathering key to apply potential from said source to said conductor, a motor rotatable in one direction in response to said potential while said feathering key is operated, means operable by said motor for introducing integration factors into other motor control circuit networks of the trainer indicative of the feathered condition of the propeller blades, means operable by said motor for causing the operation of said motor to be arrested when the simulated increase in propeller pitch has reached the operative maximum, means controlled by said latter relay for rendering said latter means ineffective, and means for arresting the operation of said motor when the increase of the propeller pitch to the feathered condition is simulated.

11. In an aircraft trainer wherein the operation of an airplane engine is simulated, a throttle control, a source of current, a control conductor, a potentiometer for deriving a potential from said source which varies with the manifold pressure of the simulated engine, a potentiometer for modifying said potential in accordance with the true air speed of the simulated flight, a rheostat controlled by said throttle control for further modifying said potential, a potentiometer for modifying the potential derived from said manifold pressure potentiometer in accordance with the pitch of the blades of the propeller driven by the simulated engine and for applying said latter potential to said control conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, and means controlled by said motor for introducing integration factors into other motor control circuit networks of the trainer commensurate with the speed of rotation of the simulated engine.

12. In an aircraft trainer wherein the operation of an airplane engine is simulated, a throttle control, a source of current, a control conductor, a potentiometer for deriving a potential from said source which varies with the manifold pressure of the simulated engine, a potentiometer serially connected with the winding of said first potentiometer for varying the energization of said winding from said source in accordance with the true air speed of the simulated flight, the first portion of said winding being of higher resistance than the remainder of said winding, a resistance shunt around said first portion of said winding including a fixed resistance and a rheostat operable by said throttle control whereby the potential derived from said manifold pressure potentiometer varies at one rate over the lower range of manifold pressures and at a slower rate over the higher range of manifold pressures in accordance with the amount of throttle opening, a potentiometer for modifying the potential derived from said manifold pressure potentiometer in accordance with the pitch of the blades of the propeller driven by the simulated engine and for applying said latter potential to said conductor, a motor responsive to an unbalanced potential condition on said conductor for adjusting said balancing potentiometer until the sum of the potentials applied to said conductor becomes zero, and means controlled by said motor for introducing integration factors into other motor control circuit networks of the trainer commensurate with the speed of rotation of the simulated engine.

13. In an aircraft trainer wherein the operation of an airplane engine is simulated, a throttle control, a source of current, a control conductor, a first rheostat controlled by said throttle control for deriving a potential from said source which varies with the throttle opening, a potentiometer for modifying said derived potential in accordance with the speed of rotation of the simulated engine and for applying it to said conductor, a second rheostat controlled by said throttle control for deriving a potential from said source which varies with the throttle opening, a potentiometer for modifying said latter potential in accordance with the altitude at which the simulated flight is being conducted, a potentiometer for further modifying said latter potential in accordance with the speed of rotation of the simulated engine, means for applying said modified potential to said conductor, a balancing potentiometer for deriving a potential from said source and for applying it to said conductor, a motor responsive to an unbalanced potential condition on said conductor for adjusting said balancing potentiometer until the sum of the potentials applied to said conductor becomes zero, and means controlled by said motor for introducing integration factors into other motor control circuit networks of the trainer commensurate with the manifold pressure of the simulated engine.

14. In an aircraft trainer wherein the operation of an airplane is simulated, a throttle control, a source of two-phase alternating current, a control conductor, a first rheostat controlled by said throttle control for deriving a first potential of a first phase from said source which increases as the throttle is opened and then decreases to zero as the throttle is further opened to full throttle, a potentiometer for reducing said derived potential as the speed of rotation of the simulated engine increases, a second rheostat controlled by said throttle control for deriving a second potential of said first phase from said source which varies with the throttle opening, a potentiometer for modifying said latter potential in accordance with the altitude at which the simulated flight is being conducted, a potentiometer for further modifying said latter potential whereby it increases as the speed of rotation of the simulated engine increases, means for applying said modified potential to said conductor, a balancing potentiometer for deriving a potential opposite in phase from said first and second potentials from said source for applying it to said conductor, a motor responsive to an unbalanced potential condition on said conductor for adjusting said balancing potential until the sum of the potentials applied to said conductor becomes zero, and means controlled by said motor for introducing integration factors into other motor control circuit networks of the trainer commensurate with the manifold pressure of the simulated engine, whereby said manifold pressure decreases upon a reduction in engine speed at high throttle openings and whereby said manifold pressure increases upon a reduction in engine speed at lower throttle openings.

JOSEPH J. LUKACS.
ROBERT O. RIPPERE.

REFERENCES CITED

The following references are of record in the file of this patent:

UNITED STATES PATENTS

| Number | Name | Date |
|---|---|---|
| 1,960,350 | Shackelton | Mar. 29, 1934 |
| 1,985,265 | Smith | Dec. 25, 1934 |
| 2,124,684 | Behr | July 26, 1938 |
| 2,153,986 | MacLaren | Apr. 11, 1939 |
| 2,155,346 | Davis | Apr. 18, 1939 |
| 2,164,412 | Koster | July 4, 1939 |
| 2,186,545 | Kuppenbender | Jan. 9, 1940 |
| 2,240,800 | Rigert | May 6, 1941 |
| 2,326,764 | Crane | Aug. 17, 1943 |
| 2,332,523 | Norden | Oct. 26, 1943 |
| 2,346,838 | Haight | Apr. 18, 1944 |
| 2,364,539 | Link | Dec. 5, 1944 |
| 2,366,603 | Dehmel | Jan. 2, 1945 |
| 2,369,418 | John | Feb. 13, 1945 |
| 2,372,741 | Roberts | Apr. 3, 1945 |
| 2,395,477 | Gumley | Feb. 26, 1946 |
| 2,397,477 | Kellogg | Apr. 2, 1946 |

FOREIGN PATENTS

| Number | Country | Date |
|---|---|---|
| 79,983 | Sweden | 1931 |
| 753,250 | France | 1933 |